(12) United States Patent
Suzuki et al.

(10) Patent No.: US 7,782,867 B2
(45) Date of Patent: Aug. 24, 2010

(54) NODE DEVICE, MEMORY MEDIUM SAVING COMPUTER PROGRAM, INFORMATION DELIVERY SYSTEM, AND NETWORK PARTICIPATION METHOD

(75) Inventors: Hiroaki Suzuki, Nagoya (JP); Kentaro Ushiyama, Nagoya (JP); Yuji Kiyohara, Nagoya (JP); Koichi Iijima, Higashikurume (JP)

(73) Assignees: Brother Kogyo Kabushiki Kaisha, Nagoya (JP); Xing Inc., Nagoya (JP)

( * ) Notice: Subject to any disclaimer, the term of this patent is extended or adjusted under 35 U.S.C. 154(b) by 183 days.

(21) Appl. No.: 12/007,834

(22) Filed: Jan. 16, 2008

(65) Prior Publication Data

US 2009/0116406 A1 May 7, 2009

Related U.S. Application Data

(63) Continuation-in-part of application No. PCT/JP2006/312988, filed on Jun. 29, 2006.

(30) Foreign Application Priority Data

Jul. 20, 2005 (JP) ............................. 2005-210077

(51) Int. Cl.
*H04L 12/28* (2006.01)
*H04L 12/56* (2006.01)
(52) U.S. Cl. ............. 370/395.31; 370/255; 370/395.52; 709/231; 709/238
(58) Field of Classification Search .................. 370/248, 370/252, 256, 255, 290, 291, 312, 395.31, 370/395.32, 395.52; 709/218, 224, 231, 709/232, 238
See application file for complete search history.

(56) References Cited

U.S. PATENT DOCUMENTS 7,418,454 B2 * 8/2008 Chen et al. .................. 707/101
(Continued)

FOREIGN PATENT DOCUMENTS

JP A-7-28685 1/1995
(Continued)

OTHER PUBLICATIONS

T. Oka et al., "Lightweight Load Balancing for Distributed Hash Tables," *Technical Report of IEICE* (with abstract), Feb. 12, 2004.

*Primary Examiner*—Aung S Moe
*Assistant Examiner*—Benjamin Elliott
(74) *Attorney, Agent, or Firm*—Oliff & Berridge, PLC

(57) ABSTRACT

A node device to participate in an overlay network formed by all or a part of a plurality of node devices, mutually connected through a communication network, including:
a device information acquisition means for acquiring device information of node devices to which participation request information is to be transmitted;
a reachable range setting means for setting up the participation request information, transmitted on the communication network;
a participation request information transmission means for adding reachable range to the participation request information and transmitting it to each of the node devices specified by the device information acquired;
a reply information receiving means for receiving reply information, transmitted from a node device, and including a transfer destination table for the overlay network; and
a transfer destination table generation means for generating the own node device on the basis of the transfer destination table included in the reply information received.

13 Claims, 15 Drawing Sheets

U.S. PATENT DOCUMENTS

| | | | |
|---|---|---|---|
| 7,519,734 B1 * | 4/2009 | Dumitriu et al. | 709/238 |
| 2002/0049760 A1 * | 4/2002 | Scott et al. | 707/10 |
| 2002/0184358 A1 * | 12/2002 | Traversat et al. | 709/223 |
| 2003/0084076 A1 | 5/2003 | Sekiguchi et al. | |
| 2003/0101253 A1 | 5/2003 | Saito et al. | |
| 2005/0223102 A1 * | 10/2005 | Zhang et al. | 709/228 |
| 2005/0243740 A1 * | 11/2005 | Chen et al. | 370/256 |
| 2006/0149806 A1 * | 7/2006 | Scott et al. | 709/201 |
| 2006/0173967 A1 * | 8/2006 | Jennings et al. | 709/208 |
| 2009/0116406 A1 * | 5/2009 | Suzuki et al. | 370/254 |

FOREIGN PATENT DOCUMENTS

| | | |
|---|---|---|
| JP | A-8-251227 | 9/1996 |
| JP | A-11-110360 | 4/1999 |
| JP | A-2001-268128 | 9/2001 |
| JP | A-2003-69600 | 3/2003 |
| JP | A-2003-99337 | 4/2003 |
| JP | A-2003-140930 | 5/2003 |
| JP | A-2003-169089 | 6/2003 |
| JP | A-2003-216521 | 7/2003 |
| JP | A-2004-120234 | 4/2004 |
| JP | A-2004-282374 | 10/2004 |
| JP | A-2005-109539 | 4/2005 |

* cited by examiner

NODE ID SPACE OF DHT

FIG.4

ROUTING TABLE 51 OF DHT OF PARTICIPATING NODE n1

| LEVEL 1 | AREA: | 0XX | 1XX | 2XX | 3XX |
|---|---|---|---|---|---|
| | NODE ID: | 002 | 123 | 221 | 301 |
| | IP ADDRESS OF PARTICIPATING NODE OF: | n15 | n1 | n4 | n11 |
| LEVEL 2 | AREA: | 10X | 11X | 12X | 13X |
| | NODE ID: | 102 | 112 | 123 | 131 |
| | IP ADDRESS OF PARTICIPATING NODE OF: | n8 | n13 | n1 | n10 |
| LEVEL 3 | NODE ID: | 120 | 121 | 122 | 123 |
| | IP ADDRESS OF PARTICIPATING NODE OF: | n12 | n6 | n7 | n1 |

FIG. 7
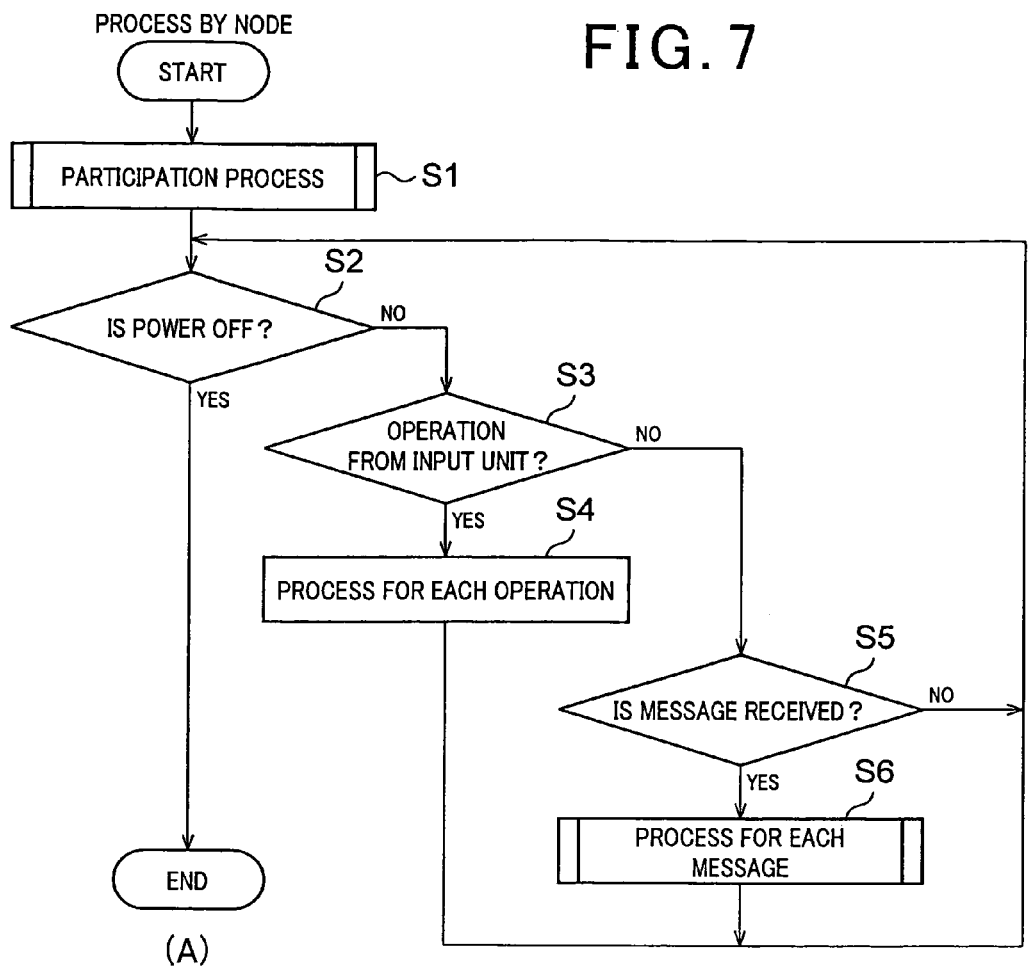
(A)
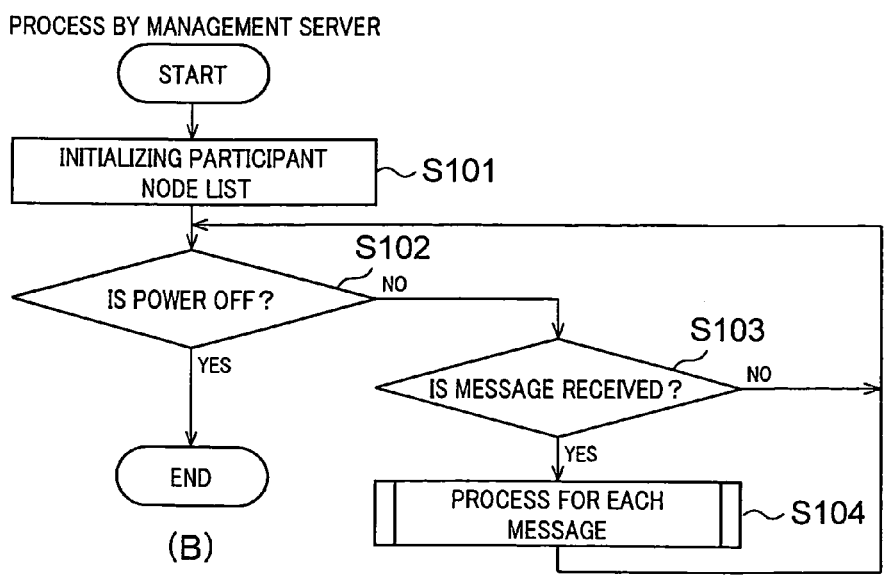
(B)

FIG.10
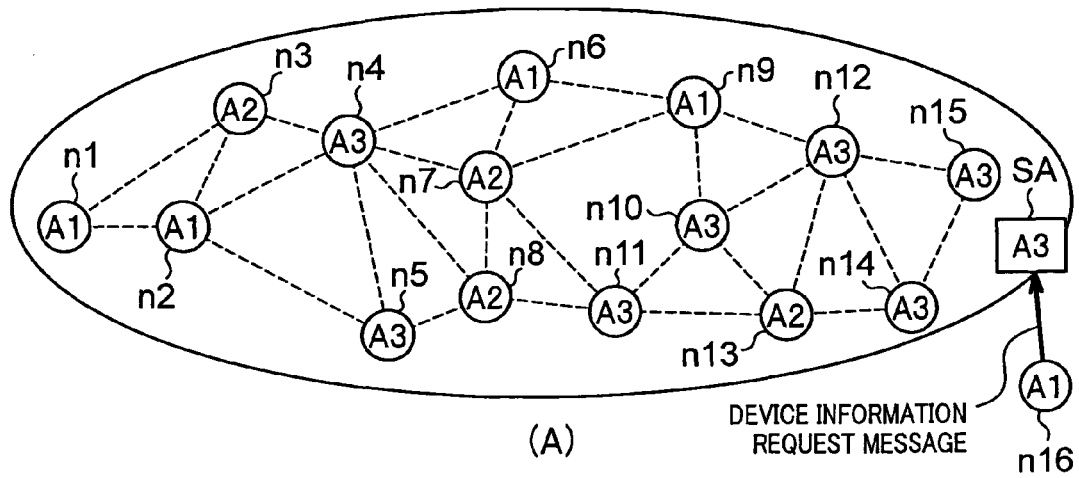
(A) DEVICE INFORMATION REQUEST MESSAGE
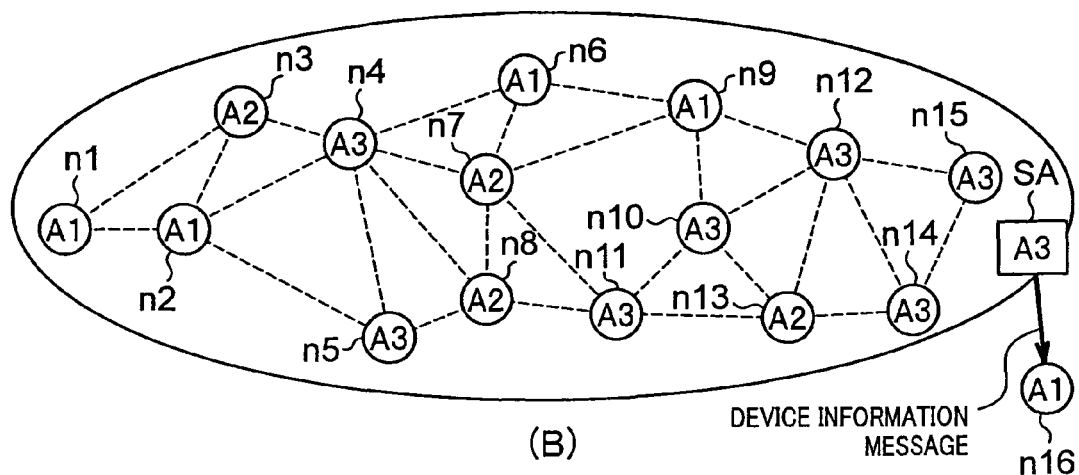
(B) DEVICE INFORMATION MESSAGE
✕: INDICATING REPLY MESSAGE DOES NOT REACH DUE TO DECREMENT OF TTL VALUE
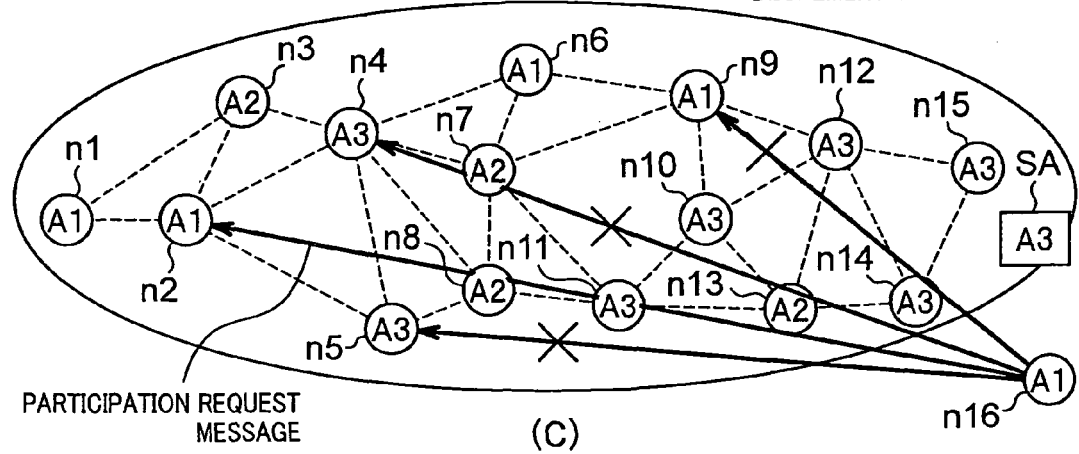
PARTICIPATION REQUEST MESSAGE
(C)

FIG.11
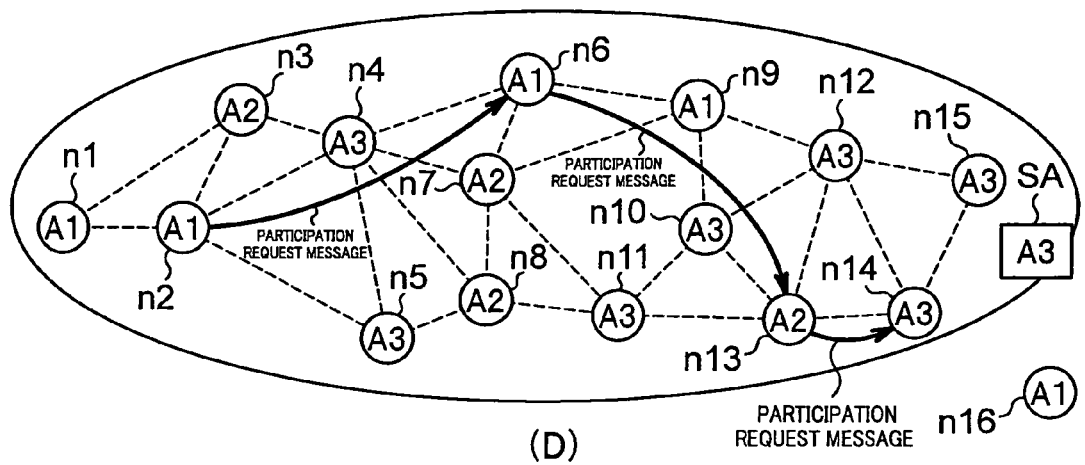
(D)
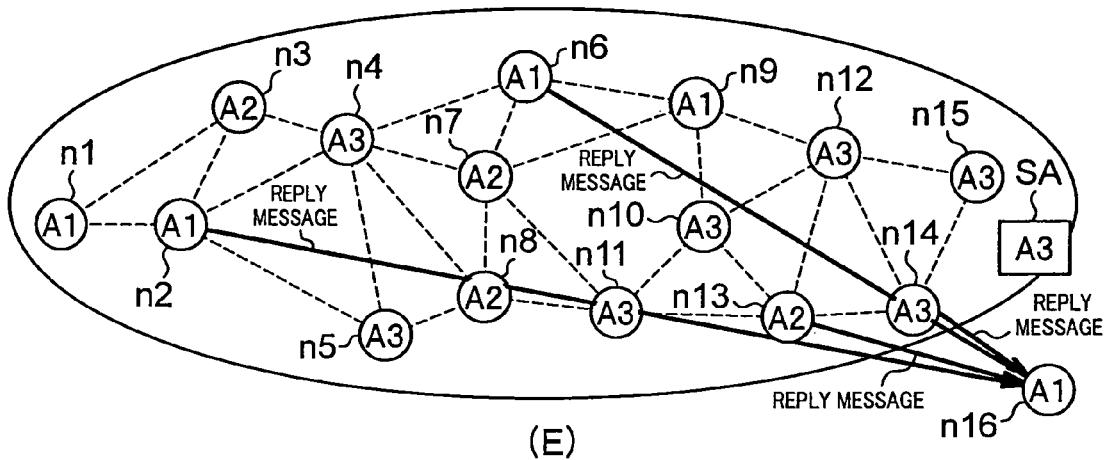
(E)
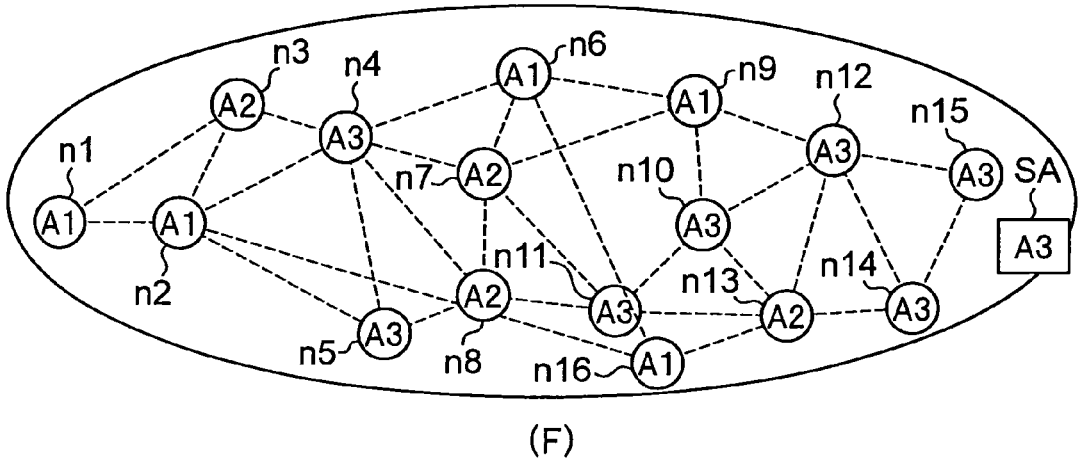
(F)

FIG.12
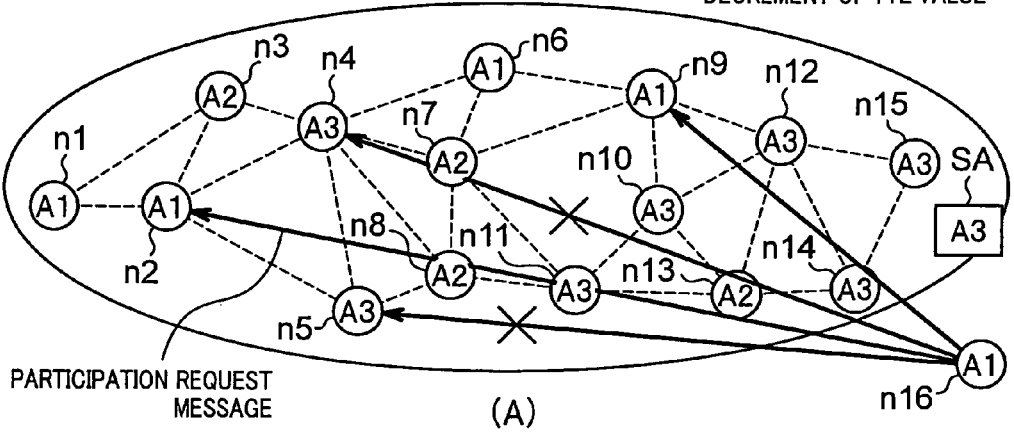
(A)
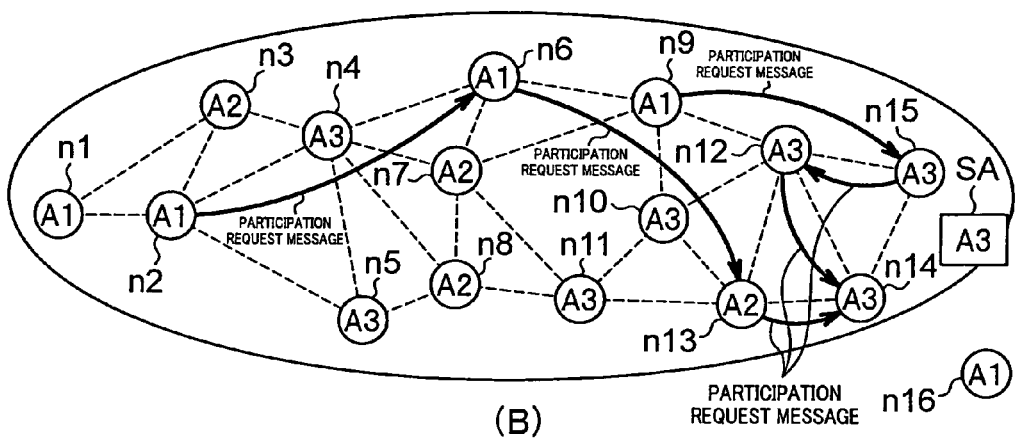
(B)
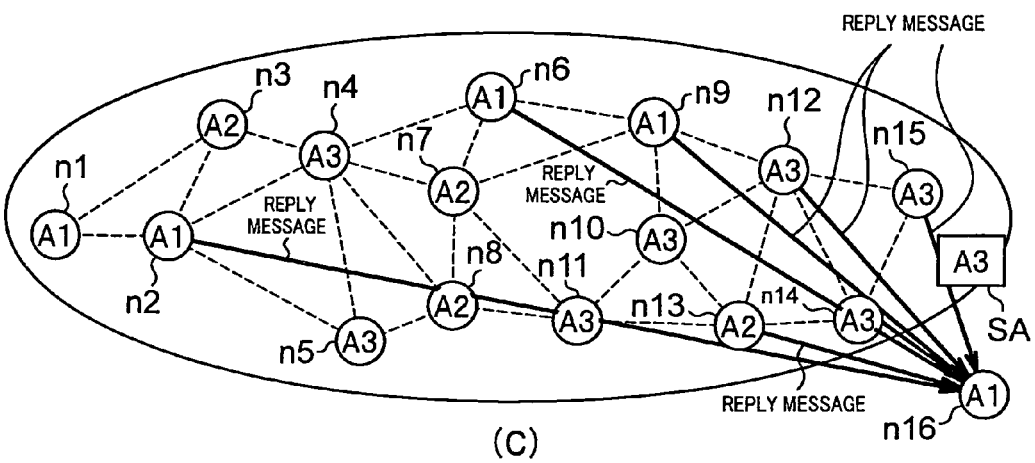
(C)

NODE DEVICE, MEMORY MEDIUM SAVING COMPUTER PROGRAM, INFORMATION DELIVERY SYSTEM, AND NETWORK PARTICIPATION METHOD

BACKGROUND OF THE INVENTION

1. Field of the Invention

The present invention relates to a peer to peer (P2P) type information delivery system including a plurality of node devices connected with each other through a communication network, and particularly relates to a technical field for a non-participant node device of participating in an overlay network formed by participation of all or part of the plurality of node devices.

2. Discussion of the Related Art

In a peer to peer type information delivery system, for example, in an overlay network constructed by use of a distributed hash table (hereinafter referred to as DHT), every node device does not recognize link information to all the node devices participating in the overlay network (for example, IP addresses) but retains only link information to some node devices which is acquired upon participation, and data inquiry or the like is performed based on such link information.

In such an overlay network, even when participation and withdrawal by a node device occur frequently, load distribution must be done appropriately. There is disclosed in the Non-patent Document 1, a technique of appropriately distributing load when participation and withdrawal into/from an overlay network occur frequently. Non-patent Document 1: "Consideration on Lightweight Load Balancing for Distributed Hash Tables", Technical Report of the Institute of Electronics, Information, and Communication Engineers.

SUMMARY OF THE INVENTION

However, in the above-mentioned related art, locality, in other words distance on a real network, of link information of each node device is not taken into consideration, and it is therefore conceivable that unnecessary load is applied to the real network.

The present invention is made in consideration of the above problem and the like, and the object of the present invention is to provide a node device, a memory medium saving a computer program, an information, delivery system, and a network participation method, each of which can construct an overlay network while considering locality and can reduce unnecessary load to a real network.

According to the present invention, there is provided a node device to participate in an overlay network which is designed to participate in the overlay network when information indicative of reachable range of the participation request information is set up, the information thus set is added to the participation request information, such the participation request information is transmitted to a plurality of node devices, and a transfer destination table to be used by the own node device is generated based on a transfer destination table, included in reply information transmitted from a node device which receives the participation request information. Therefore, it is possible to construct an overlay network in consideration of locality on a communication network and to reduce unnecessary load to the communication network.

BRIEF DESCRIPTION OF THE DRAWINGS

FIG. 4 is a conceptual diagram showing an example of a node ID space of DHT.

FIG. 7(A) is a flowchart for showing main routines of a node (common for both the participant node nn and the non-participant node nm).

FIG. 7(B) is a flowchart for showing main routines of a management server SA.

FIG. 10 is a conceptual diagram for showing an example of how a non-participant node 16 newly participates in an overlay network 9 in the Embodiment 1.

FIG. 11 is a conceptual diagram for showing an example of how the non-participant node 16 newly participates in an overlay network 9 in the Embodiment 1.

FIG. 12 is a conceptual diagram for showing an example of how the non-participant node 16 newly participates in an overlay network 9 in the Embodiment 1.

DETAILED DESCRIPTION OF THE PREFERRED EMBODIMENTS

Figure 1:
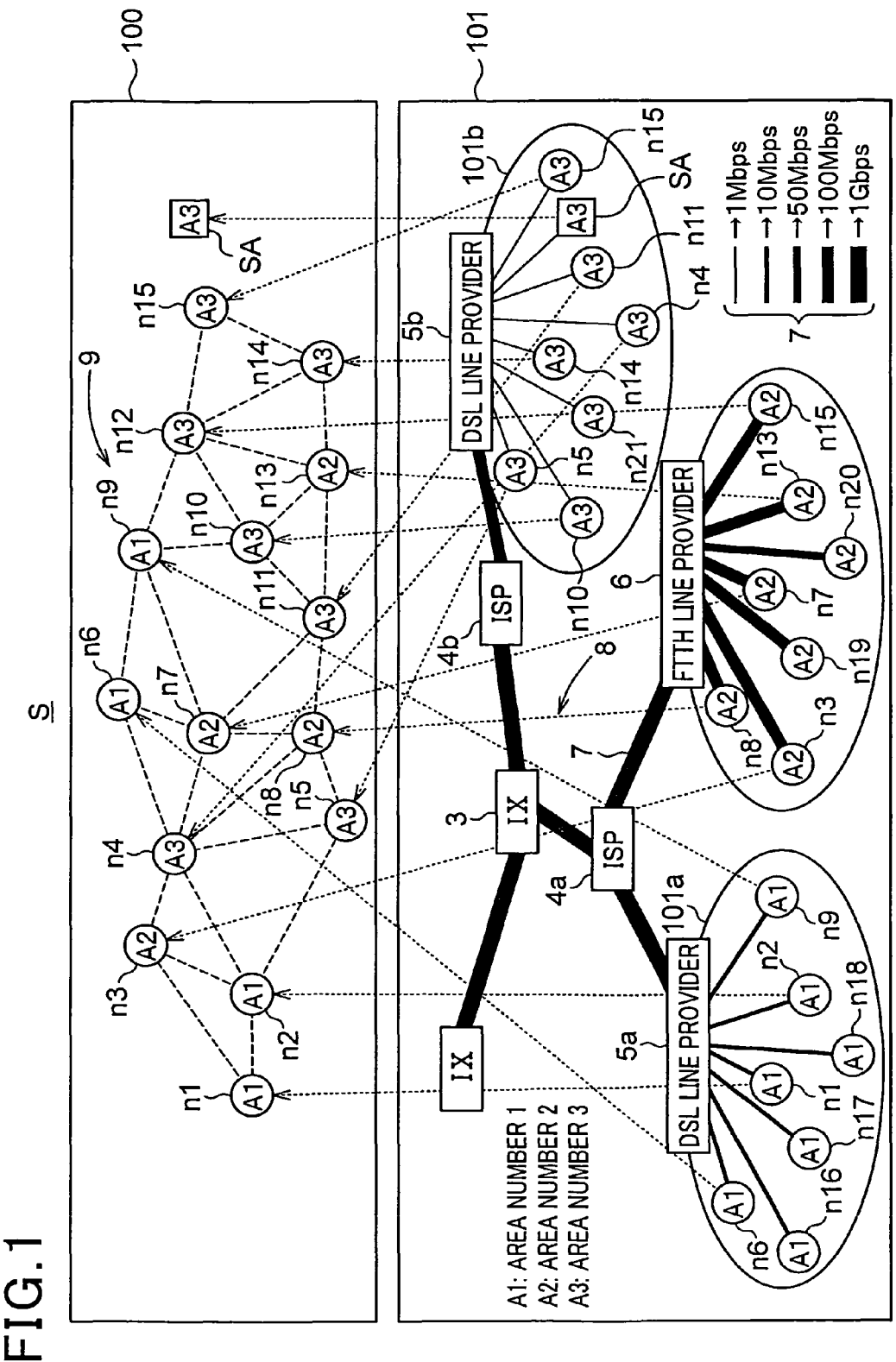
FIG. 1 is a view for showing an example of connection mode of node devices in a content delivery system according to the present embodiment.

Preferred embodiments of the present invention will be described as follows. Hereinafter, each designation of numerical reference in the drawings is typically as follows:

1: node device;
8: network;
11: control unit;
12: storage unit;
13: buffer memory;
14: decoder;
15: image processing unit;
16: display unit;
17: audio processing unit;
18: speaker;
20: communication unit;
21: input unit;
22: bus;
SA: management server; and
S: content delivery system Hereafter, best embodiments of the present invention will be explained based on figures. The embodiments explained below are embodiments when the present invention is applied to a content delivery system.

[1. Configuration and the Like of Content Delivery System]

First, with reference to FIG. 1, schematic configuration and the like of a content delivery system will be explained.

FIG. 1 is a diagram for showing an example of connection status of each node device in a content delivery system according to the present embodiment.

As shown in a lower rectangular frame 101 in FIG. 1, a network 8 (network in real world) like the Internet is constructed by an Internet eXchange (IX) 3, Internet Service Providers (ISP) 4a and 4b, Digital Subscriber Line providers (or device thereof) 5a and 5b, fiber to home line provider (or device thereof) 6, and communication line (such as a telephone line or an optical cable) 7 and the like. Here, in the network 8 (communication network) in the example of FIG. 1, a router for transferring data (packet) is appropriately inserted (not shown).

A content delivery system S is constructed by a plurality of node devices n1, n2, ... n21, which are connected with each other via such the network 8 and is a peer to peer network system (in actuality, there are more node devices in the system). Further, unique manufacturing number and internet protocol (IP) address are assigned to each of the node devices n1, n2 ... n21, respectively. Here, none of manufacturing number and IP address overlap in a plurality of node devices 1.

In this content delivery system S, an overlay network 9 shown in the upper rectangular frame 100 of FIG. 1 is constructed by a specific algorithm, for example, one using a DHT. In other words, the overlay network 9 means a network which configures a virtual network (logical network) formed by using an existing network 8.

In the present embodiment, on the premise that an overlay network 9 is configured by an algorithm using DHT, node devices n1 to n15 provided on this overlay network 9 are called node devices participating in the overlay network 9 (inside upper rectangular 100 in FIG. 1) (hereinafter, such node devices n1 to n15 are generally referred to as participant node nn). In other words, the overlay network 9 is formed by participation of the participant node device nn. Participation into such an overlay network 9 is carried out when node devices n16 to n21, which does not participate yet (hereinafter generally referred to as non-participant node nm), send participation request information indicative of participation request to an arbitrary node device nn.

Further, each of the participant node nn has a node ID as unique identification information. The node ID is a hashed value obtained by hashing a number unique to each node device such as an IP address or manufacturing number (for example, bit length is 160 bit) obtained by a common hash function (e.g. SHA-1), and is distributed and located in one ID space without deviation.

Further, in the present embodiment, IP address hashed by a common hash function is set to be a node ID. Further, in the content delivery system S shown in the example of FIG. 1, there is a management server SA which manages device information of all the participant nodes nn (e.g. node ID, IP address, and port number). However, without such a management server SA, an overlay network 9 can be formed.

Each of the (hashed) node IDs obtained by a common hash function in such a manner has a very low possibility of having the same values when the IP address or the manufacturing number differs from each other. With regards to the hash function, since it is known, detailed explanation thereof is omitted.

Further, each of participant nodes nn has a DHT. The DHT regulates to a transfer destination of information on an overlay network. Specifically, the DHT of a participant node nn includes a routing table (transfer destination table) in which a plurality of combination of a node ID and IP address or the like of another participant node nn are registered, which is appropriately apart from the participant node nn Such a DHT is given when a non-participant node nm participates in the overlay network 9.

Further, in the content delivery system S, participation of a non-participant node nm into the overlay network 9 or withdrawal of a participant node nn from the overlay network 9 frequently occurs. Therefore, it is periodically confirmed whether or not update of a DHT is necessary (for example, with an interval of several tens of minutes to several hours) and at the same time, the update information is transmitted to other participant nodes nn in accordance with a routing table of DHT. Thus, it is possible to maintain a DHT in the newest condition.

Further, in the overlay network 9, various content data (for example, movie, music or the like) are distributed to and saved (stored) in a plurality of participant nodes nn. For example, content data of a movie titled XXX is saved in a participant node n1, and meanwhile content data of a movie titled YYY is saved in a participant node n2. In such a manner, content data mutually different are distributed and saved in a plurality of participant nodes nn.

Further, certain content data are not limited to only one participant node nn, and the same content data may be saved in a plurality of participant nodes nn. To each of these content data, a content name (title) or the like is given.

Further, location information indicating location of content data thus distributed and saved (for example, IP address or the like of a participant node nn in which the content data are saved) is also distributed to and saved in a plurality of participant nodes nn. For example, a content name of certain content data (or a few bytes in the head of the content data) are hashed by a hash function in common with a hash function, used in obtaining the node ID (that is, located on the same ID space as a hashed value of an IP address of the participant node nn), and in a participant node nn having a node ID which is closest to the hashed value (the hashed value becomes a content ID), location information of the content data are saved. In other words, even when the same content data (having the same content ID) is saved in a plurality of participant nodes nn, location information indicating such content data (IP addresses or the like of a plurality of participant nodes nn) can be managed by one participant node nn (hereinafter, a participant node which manages location of content data in such a manner will be referred to as a "root node"). Here, in the present embodiment, location information of content data corresponding to one content ID is saved in one root node (that is, a root node and the location information have a one to one relation). However, the present invention is not limited thereto.

Thus, a participant node which is used by a user who wants to acquire (download) certain content data, for example a participant node n4, transmits a query having a content ID of the content data added to other participant nodes nn. The query having the content ID added passes through some participant nodes nn (a routing table of the DHT is referred in each of the relay nodes, and the content ID is transferred), reaches a root node n10 saving location information indicative of location of the content data. Then it becomes possible to acquire (receive) the location information from the root node n10. Then, the participant node n4 is connected to another participant node on the basis of the location information thus acquired, for example, a participant node n5, which saves the content data and is enabled to acquire (receive) the content data from there.

Figure 2:
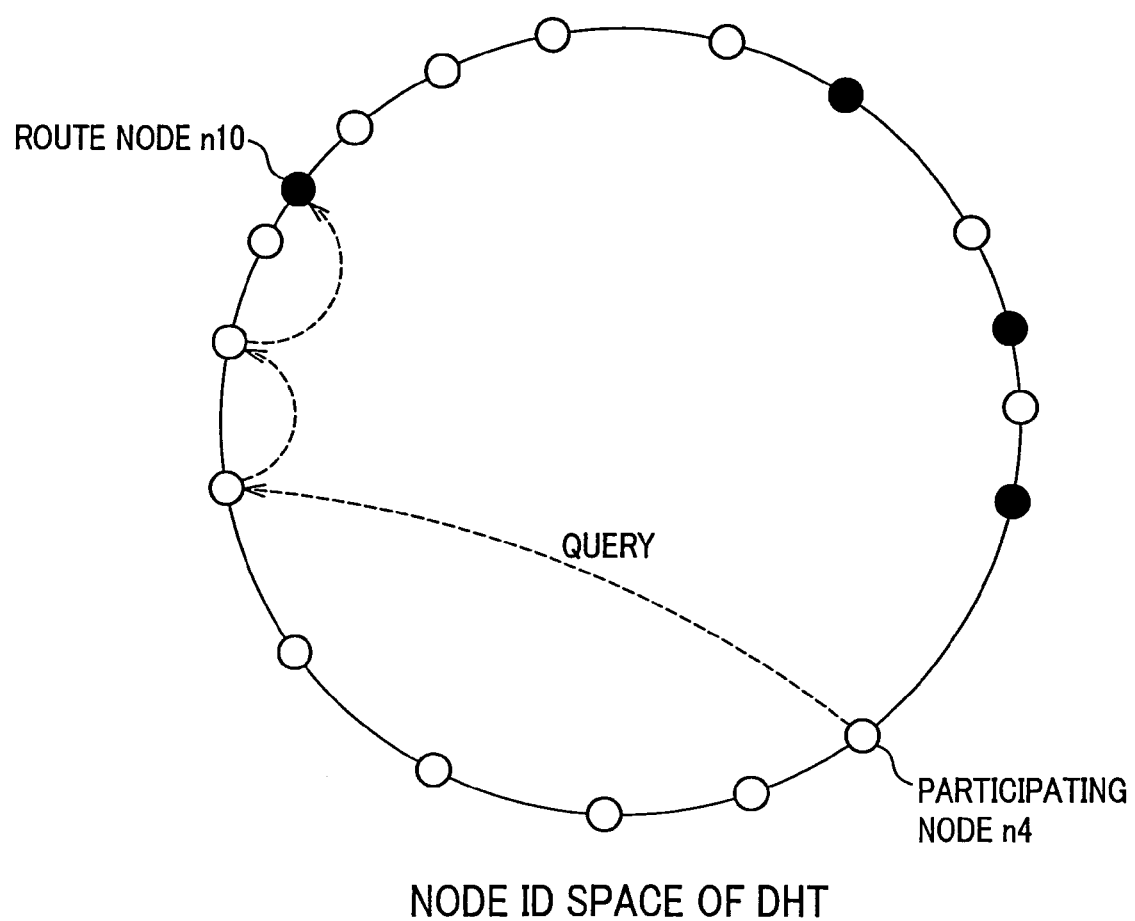
FIG. 2 is a view for showing an example of how a query transmitted from a participant node n1 is transferred to a root node n10 in a node ID space of DHT.

The content ID may acquire (receive) location information from another participant node nn, which caches the same location information as that of the root node n10 until the content ID reaches the root node n10, FIG. 2 is a view for showing how a query transmitted from the participant node n4 is transferred to the root node n10 in the node ID space of the DHT. In the example of FIG. 2, each of relay nodes compares content ID added to the received query and a node ID, registered in a routing table of the DHT, specifies a participant node nn to which the query is to be transferred next (for example, specifies an IP address of a participant node nn corresponding to the node ID having top several digits matching those of the content ID), and transfers the query thereto.

Here, an example of general concept of a routing table of the DHT will be described below.

Figure 3:
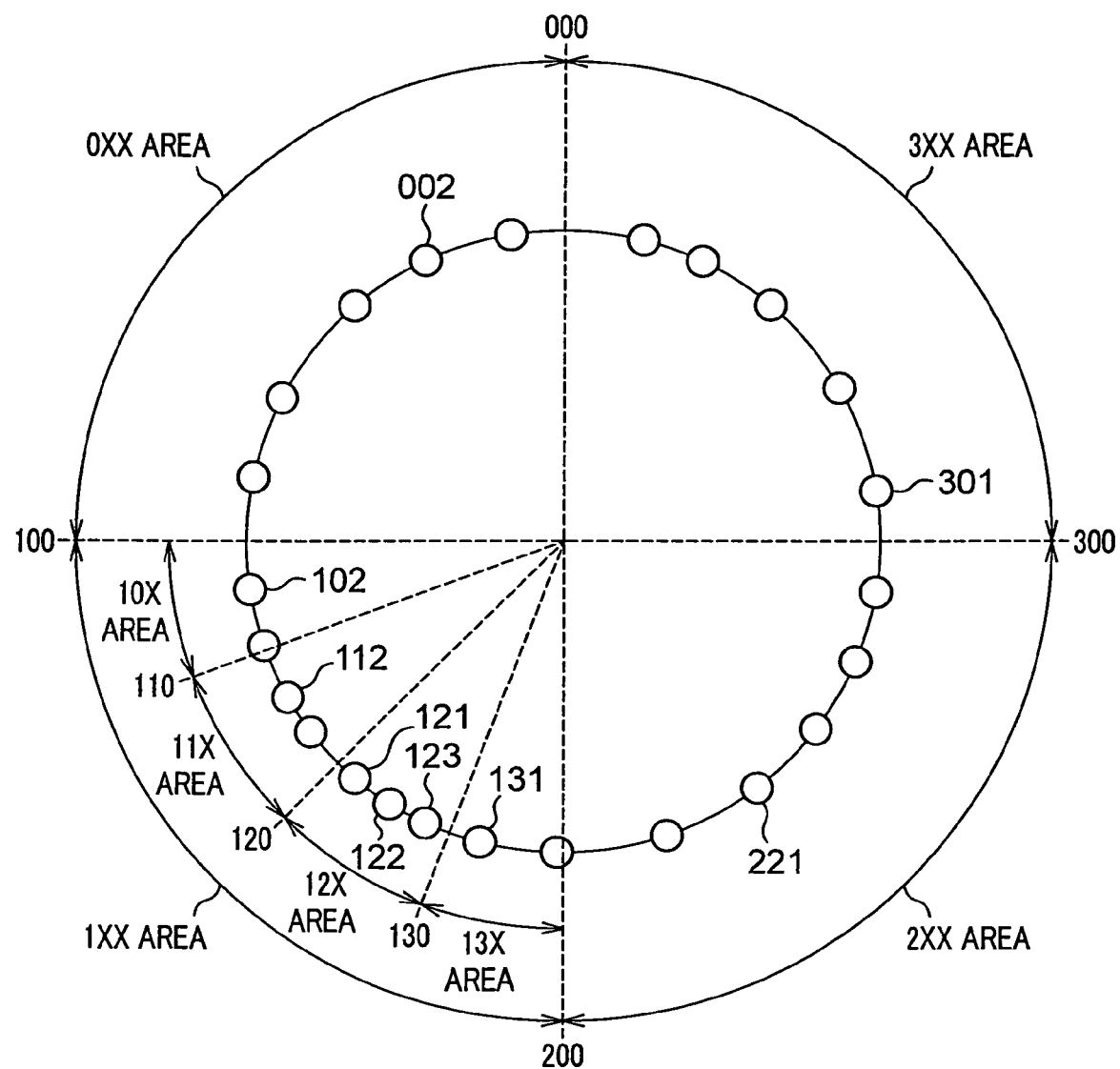
FIG. 3 is a view for showing an example of a routing table of DHT, retained by the participant node n1.

FIG. 3 is a view for showing an example of a routing table of the DHT, retained by the participant node n1, and FIG. 4 is a conceptual diagram for showing an example of a node ID space of the DHT. Here, in the examples of FIGS. 3 and 4, for the convenience of explanation, bit length of a node ID is set to be 2 bit×3 digits=6 bit, and each digit is expressed by quarternary number (actually, a longer bit length is used, and each digit is divided into for example 4 bit and expressed by hexadecimal of 0 to f).

In the example of FIG. 3, the routing table of the DHT includes tables of levels 1 to 3 (classified into a plurality of levels). In a table entry of each level, node IDs and IP addresses of participant nodes nn corresponding to the node IDs are correlated and registered. Each area of a table in each level is an area obtained by dividing a node ID space of the DHT. For example, as shown in FIG. 4, in level 1, an entire node ID space of the DHT is divided into four, and an area where node IDs "000" to "033" exist is designated as a 0XX area, an area where node IDs "100" to "133" exist is designated as a 1XX area, an area where node IDs "200" to "233" exist is designated as a 2XX area, and an area where node IDs "300" to "333" exist is designated as a 3XX area. Further, in level 2, areas in level 1 (that is, areas "0XX" to "3XX") are further divided into four. For example, 1XX area is divided into four and an area where node IDs "100" to "103" exist is designated as a 10X area, an area where node IDs "110" to "113" exist is designated as a 11X area, an area where node IDs "120" to "123" exist is designated as a 12X area, and an area where node IDs "130" to "133" exist is designated as a 13X area.

Then, for example, when a node ID of the participant node n1 is assumed to be "123", as shown in FIG. 3, node ID and IP address of the own participant node n1 (because IP address belongs to the node n1, registration of the IP address in the routing table is not required) are registered in a table entry of such participant node n1 in 1XX area-(where the participant node n1 exists) in level 1, and node IDs and IP addresses of other arbitrary participant nodes are registered in areas where the node n1 does not exist (in other words, 0XX, 2XX, and 3XX areas).

Further, as shown in FIG. 3, node ID and IP address of the own participant node n1 (because IP address belongs to the node n1, registration of the IP address in the routing table is not required) are registered in the table entry of such participant node n1 in 12X area (an area where the node n1 exists) of level 2, and node IDs and IP addresses of other arbitrary participant nodes are registered in areas where the node n1 does not exist (in other words, 10X, 11X, and 13X areas).

Further, as shown in FIG. 3, node IDs and IP addresses of all the participant nodes nn existing in the 12X area are registered in level 3 of such participant node n1.

In the examples of FIGS. 3 and 4, since bit length of node ID is set to be three digits×2 bit, a table having three levels can cover everything. However, when bit length of a node ID is increased, table is required as many as the increased amount (for example, when bit length of a node ID is set to be 16 digits×4 bit, a table for 16 levels is required).

As described above, in a routing table of DHT according to the present embodiment, the higher the level becomes, the narrower the area becomes. Due to a routing table thus configured, a query transmitted from for example the participant node n1 is efficiently transferred to a root node.

Such a routing table of DHT is generated by transmitting a participation request having an own node ID attached thereto for the purpose of participating in the overlay network 9.

A flow until generation of such a routing table of DHT will be described below.

Figure 5:
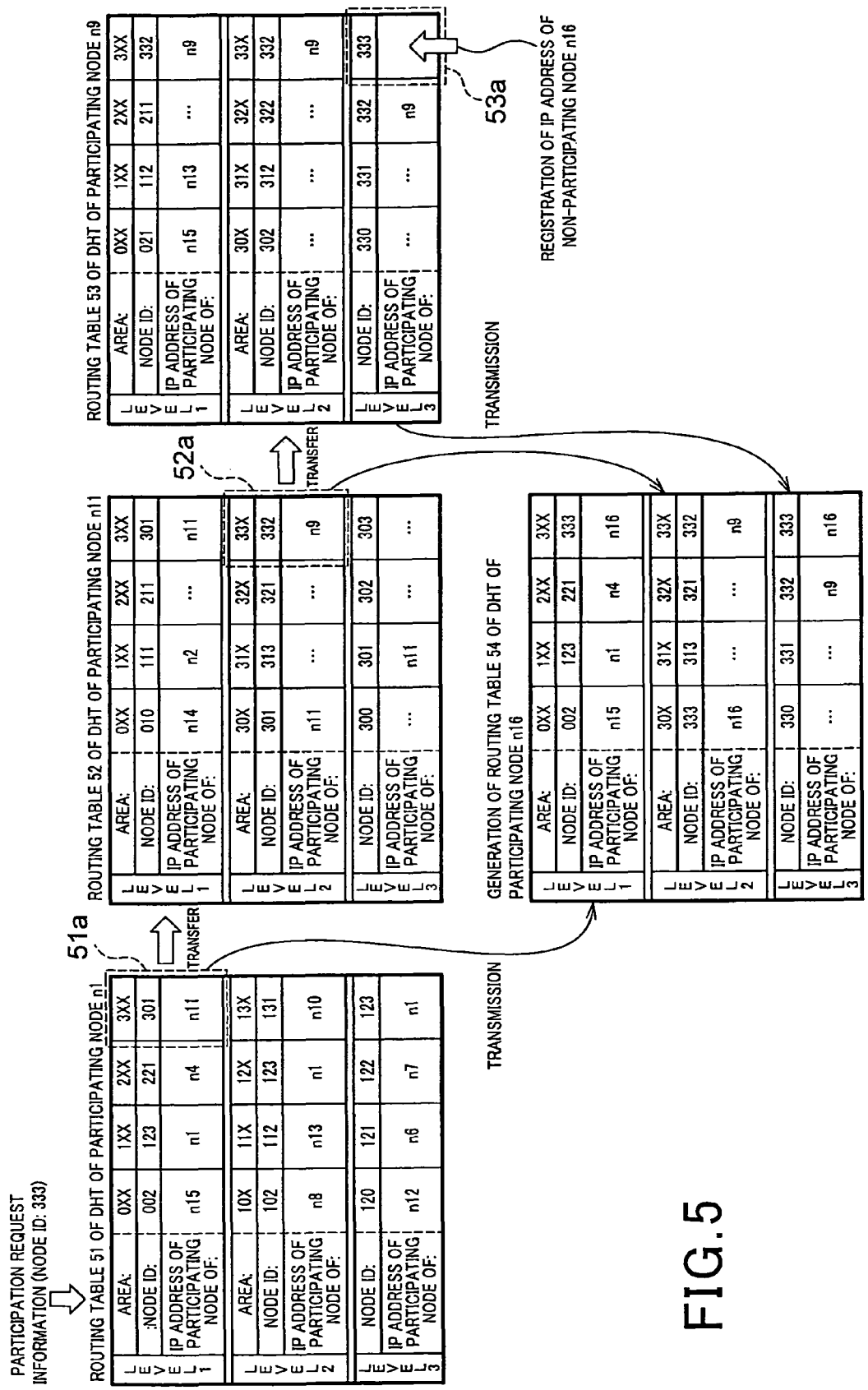
FIG. 5 is a conceptual diagram showing an example of a flow until generation of a routing table of a DHT.

FIG. 5 is a schematic view for showing an example of a flow until a routing table of DHT is generated.

For example, as shown in FIG. 5, a non-participant node n16 hashes an own IP address of the node 16 by the hash function to generate a node ID (for example, "333"), and transmits participation request information, having this node ID and the IP address of the non-participant node n16 added to it, to the participant node n1.

On the other hand, the participant node n1 receives the participation request information, refers to a routing table 51 of DHT, and obtains the IP address of a participant node n11 having a node ID "301", which is closest to the node ID "333"

added to the participation request information. Based on this, the participant node n1 transfers the participation request information, having the node ID "333" and the IP address of the non-participant node n16 added to it, to the node ID "333".

On the other hand, the participant node n11 receives the participation request information, refers to a routing table 52 of DHT, and obtains the IP address of a participant node n9 having a node ID "332", which is closest to the node ID "333" added to the participation request information. Based on this, the participant node n1 transfers the participation request information, having node ID "333" and the IP address of the non-participant node n16 added to it, to the participant node n9.

On the other hand, the participant node n9 receives the participation request information, associates the IP address of the non-participant node n16 with a node ID "333" in a table in level 3 of the routing table 53 of DHT, and registers the IP address of the non-participant node n16. In other words, the participant node n9 manages the node ID "333".

In the above-mentioned flow, as shown in FIG. 5, each of the participant nodes n1, n11, and n9, which receive the participation request information, transmits reply information including a part of the routing table of DHT (the participant node n1 transmits a table in level 1, the participant node n11 transmits a table in level 2, and the participant node n9 transmits a table in level 3) to the non-participant node n16.

On the other hand, the non-participant node n16 receives reply information including routing tables of each DHT thus transmitted and generates a routing table 54 of a DHT to be used by the non-participant node n16 based on each routing table included in the reply information. At this time, when other already-known node information can be registered in each entry, the entry may be rewritten. In the example of FIG. 5, the table entry 51a in level 1 of the participant node n1 (a node ID "301" and an IP address corresponding thereto) is substituted by a node ID "333" and an IP address corresponding thereto. In the example of FIG. 5, each of participant nodes nn returns a table of different levels. However, tables from all the level may be returned from any of participant nodes nn (that is, a routing table as a whole) and a non-participant node nm may appropriately select a table entry to form a new table.

The non-participant node n16, which has obtained the routing table 54 of DHT thus generated, participates in the overlay network 9 as a participant node n16.

Meanwhile, it is preferable that a routing table of DHT thus generated reduces load to the network 8 (load generated by transmission of information including node ID on the network 8) as much as possible. In the present embodiment, in order to generate a routing table of DHT which can reduce the load to the network 8, participation request information is transmitted to an arbitrary plurality of participant nodes nn and among them, a participant node nn with its locality considered returns the reply information.

For example, in the lower rectangular frame 101 of FIG. 1, it is possible to assume that locality between the participant node n1 and the non-participant node n16 belonging to the same line provider (for example, line provider 5a) is high. On the other hand, locality between the participant node n1 and a non-participant node n21 which belongs to a different line provider (for example, line provider 5b) is low (that is, once via ISP4a, IX3, and ISP4b). In the example of FIG. 1, an identical area number (A1, A2, A3) is appended to the participant node n1 and the non-participant node n16 belonging to the same line provider.

Here, a participant node nn with its locality considered means a participant node nn having high locality with respect to a non-participant node nm, in other words, a participant node nn which is close to the non-participant node nm on a network (in other words, communication load on a communication route with respect to the non-participant node nm is relatively small).

When a non-participant node nm receives reply information from a participant node nn of which locality on the network 8 has been taken into consideration and generates the routing table 54 of DHT to be used by the non-participant node nm based on a routing table of DHT included in the reply information, for example, content ID and node ID are transferred between participant nodes nn which are close with each other network-wise and, as a result, load to the whole of the network 8 can be reduced.

The flow mentioned above can be applied to a case where a node which has withdrawn from the overlay network 9 participates again in the network, as well as the case where a node newly participates in the network.

Next, with reference to FIG. 6, configuration and function of the participant nodes nn and the non-participant nodes nm will be explained.

Figure 6:
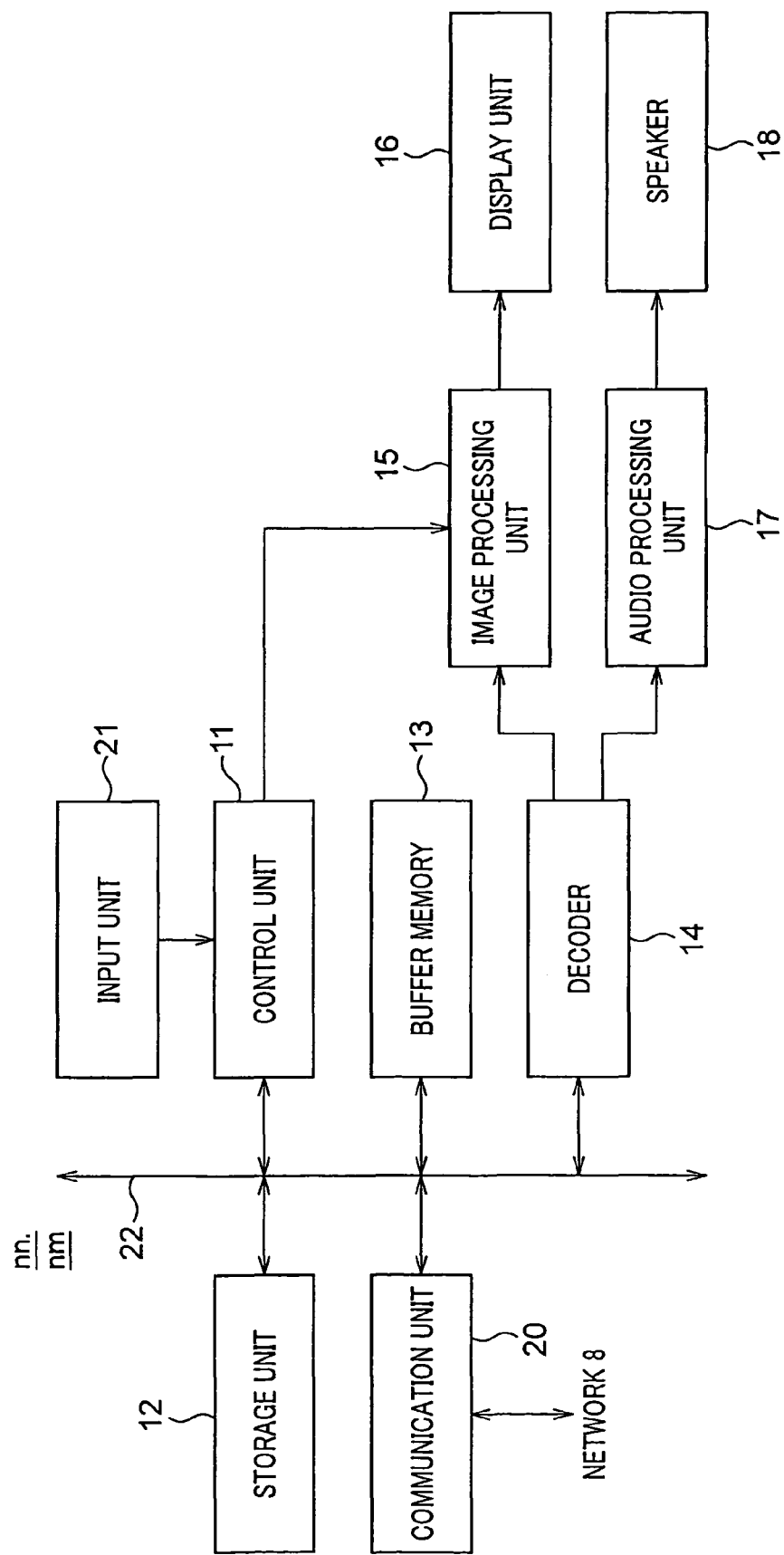
FIG. 6 is a view for showing a schematic block diagram of a participant node nn and a non-participant node nm.

FIG. 6 is a view showing schematic configuration of the participant node nn and the non-participant node nm.

Each of the participant node nn and the non-participant node nm is configured by including, as shown in FIG. 6, a control unit 11 which is a computer configured by having a CPU having computing function, a RAM for work, and a ROM for storing various data and programs, a storage unit 12 configured by an HDD or the like for saving and retaining (storing) various data (for example, content data, location information, and DHT), a buffer memory 13 for temporarily storing received content data, a decoder 14 for decoding (stretching data or decrypt) encoded video data (image information 9 and audio data (voice information) included in the content data, an image processing unit 15 for providing predetermined graphic processing to the decoded video data or the like to thereby output the data as video signal, a display unit 16 such as CRT or liquid crystal display for displaying image based on the video signal outputted from the image processing unit 15, an audio processing unit 17 for converting the decoded audio data by digital/analog (D/A) conversion into analog audio signal and thereafter amplifying the converted signal by an amplifier to output this, a speaker 18 for outputting the audio signal outputted from the audio processing unit 17 as acoustic wave, a communication unit 20 for performing communication control of information between other participant nodes nn or non-participant nodes nm via the network 8, and an input unit 21 which receives instruction from a user and provides instruction signal corresponding to the instruction to the control unit 11 (for example, such as a key board, a mouse, or an operation panel) and the control unit 11, the storage unit 12, the buffer memory 13, the decoder 14, and the communication unit 20 are connected with each other via a bus 22.

In such the configuration, when CPU in the control unit 11 reads out and performs a program saved in the storage unit 12 or the like (including a computer program of the present invention), the control unit 11 of the participant node n1 controls in its entirety. At the same time, the control unit 11 functions as a device information acquisition means, a reachable range setting means, a participation request information transmission means, a reply information receiving means, and a transfer destination table generation means to perform later-described various processes.

Further, when the CPU reads out and executes a program saved in the storage unit 12 or the like, the control unit 11 in the participant node nn controls its entirety. At the same time, the control unit carries out various process such as transmission and receiving of node ID and content ID, content data, location information and the like in the overlay network 9. Further, the control unit receives search information, participation request information and the like from a non-participant node nm or the like and carries out later-described various processes.

The computer program maybe downloaded from, for example, a given server on the network 8, or may be recorded onto a memory medium such as a CD-ROM so as to be read out through a drive unit for the memory device.

[2. Operation of Content Delivery System]

Next, operation of the content delivery system S in a case where a non-participant node nm newly participates in the overlay network 9 will be explained in Embodiments 1 to 3, respectively.

Embodiment 1

First, with reference to FIGS. 7 to 12, operation of the content delivery system S in the Embodiment 1 will be explained.

This Embodiment 1 is an operation example in a case where the management server SA for managing a participant node list, in which device information (link information) to all the participant nodes nn is described, is connected to the network 8.

FIG. 7 (A) is a flowchart for showing main routine of a node (common for both the participant node nn and the non-participant node nm), and FIG. 7 (B) is a flowchart for showing a main routine of the management server SA.

Figure 8:
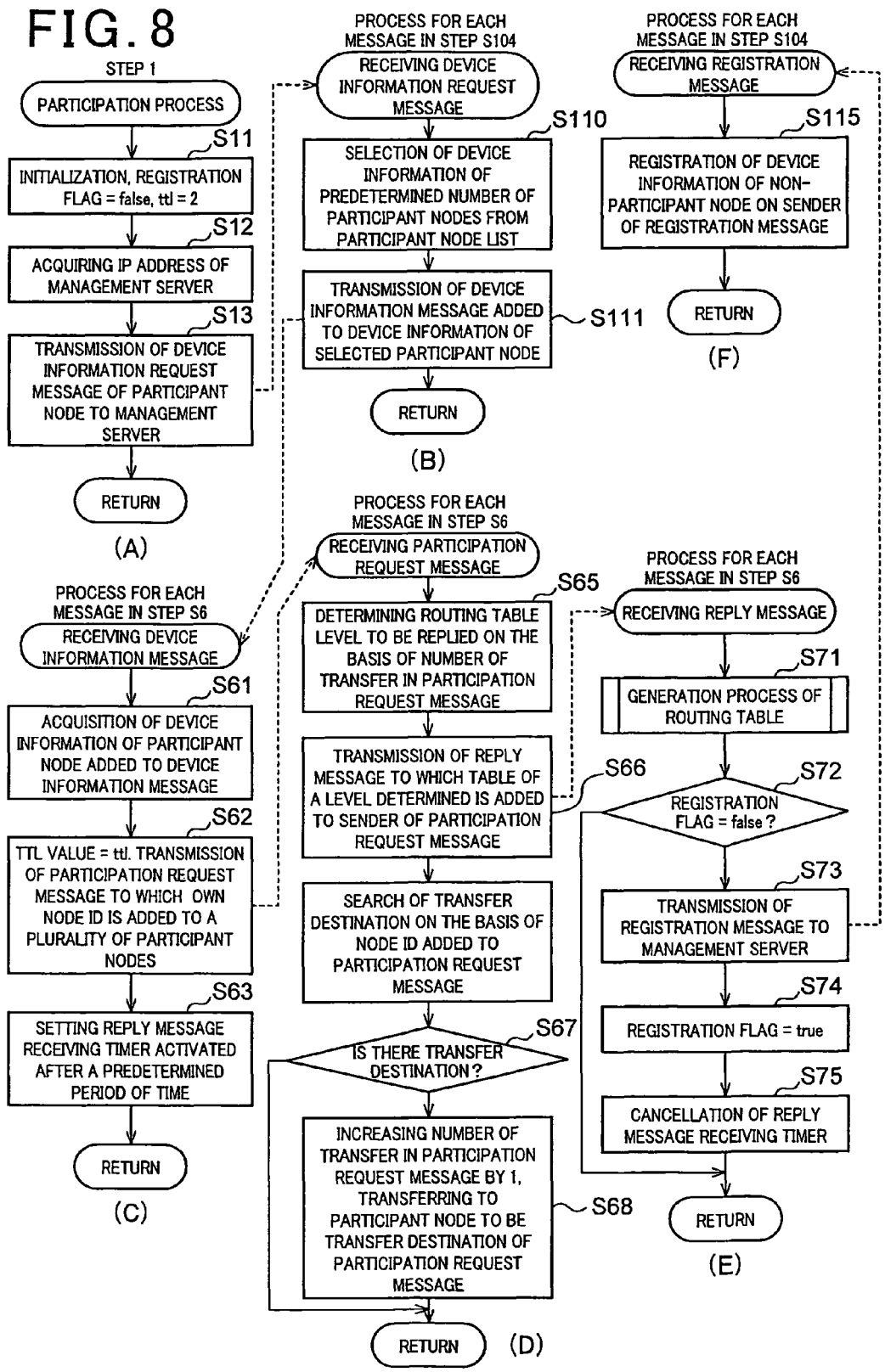
FIG. 8(A) is a flowchart for showing details of participation process in Step S1 shown in FIG. 7(A) in Embodiment 1.
FIG. 8(B) is a flowchart for showing process by the management server SA when a device information request message is received in the Embodiment 1.
FIG. 8(C) is a flowchart for showing process by the non-participant node nm when a device information message is received in the Embodiment 1.
FIG. 8(D) is a flowchart for showing process by the participant node nn when a participation request message is received in the Embodiment 1.
FIG. 8(E) is a flowchart showing process by the non-participant node nm when a reply message is received in the Embodiment 1.
FIG. 8(F) is a flowchart showing process of the management server SA when a registration message is received in the Embodiment 1.

Further, FIG. 8 (A) is a flowchart for showing details of participation process in Step S1 shown in FIG. 7 (A) in Embodiment 1, FIG. 8 (B) is a flowchart for showing process by the management server SA when a device information request message is received in the Embodiment 1, FIG. 8 (C) is a flowchart for showing process by a non-participant node nm when a device information message is received in the Embodiment 1, FIG. 8 (D) is a flowchart for showing process by a participant node nn when a participation request message is received in the Embodiment 1, FIG. 8 (E) is a flowchart for showing process by the non-participant node nm when a reply message is received in the Embodiment 1, and FIG. 8 (F) is a flowchart for showing process of the management server SA when a registration message is received in the Embodiment 1.

Figure 9:
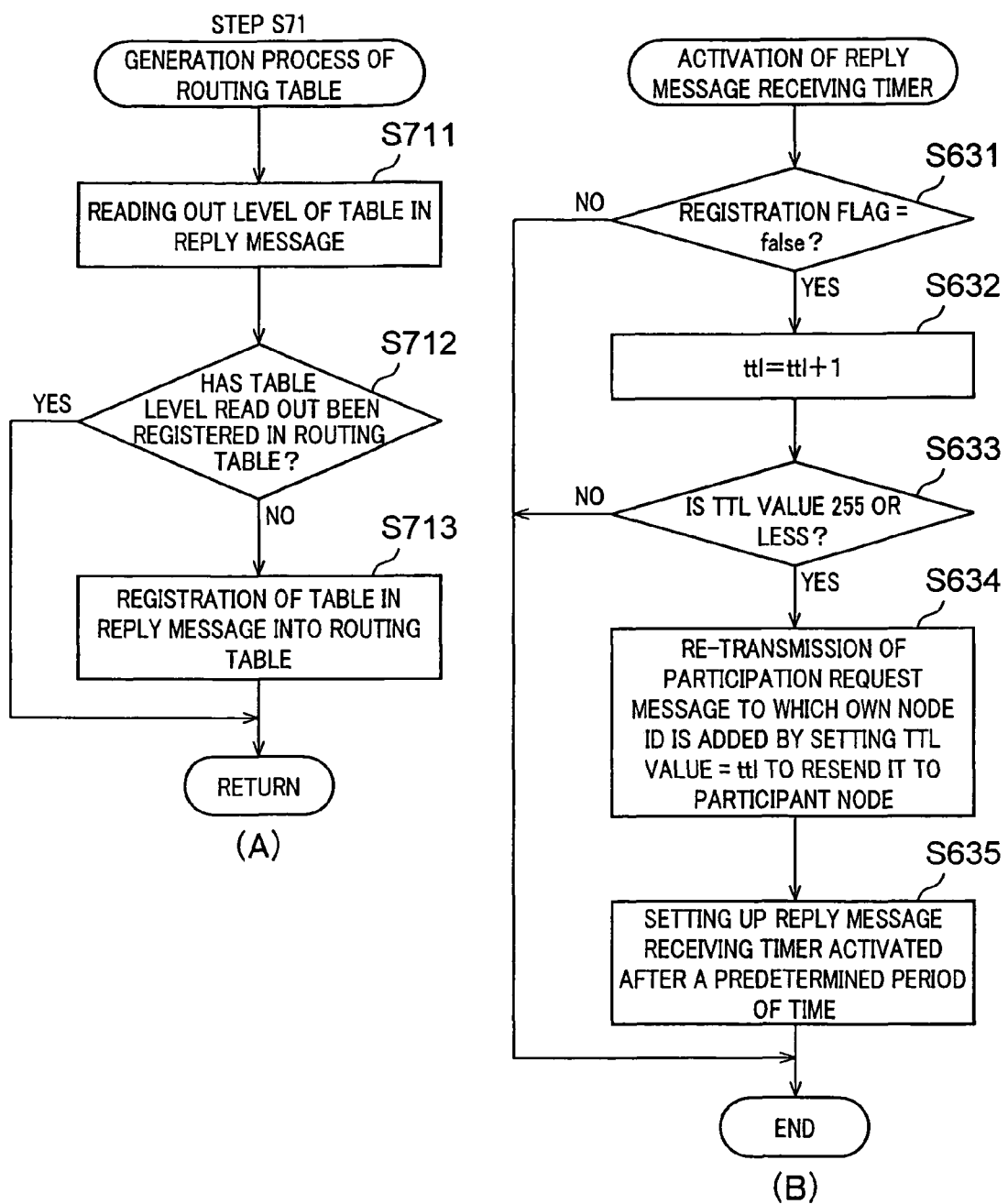
FIG. 9(A) is a flowchart for showing details of generation process of a routing table in Step S71 shown in FIG. 8(E).
FIG. 9(B) is a flowchart for showing process by the non-participant node nm when a reply message receiving timer is activated.

Further, FIG. 9 (A) is a flowchart for showing details of generation process of a routing table in Step S71 shown in FIG. 8 (E). FIG. 9 (B) is a flowchart for showing process by the non-participant node nm when a reply message timer is activated.

Further, FIGS. 10 to 12 are conceptual diagrams for showing how a non-participant node 16 newly participates in the overlay network 9 in Embodiment 1.

Process of FIG. 7 (A) starts when, for example, power of a non-participant node nm is cut in. First, the control unit 11 carries out a participation process for participating into the overlay network 9 (details of the process will be described later) (Step S1). Next, the control unit 11 judges whether or not the power is turned off (Step S2). When the power is turned off (Step S2: Y), the process is finished. On the other hand, when the power has not been turned off (Step S2: N), the control unit 11 judges whether or not the node is operated by a user through the input unit 21 (Step S3). When operated (Step S3: Y), process for each operation (process corresponding to operation signal) is executed (Step S4). On the other hand, when a user does not operate (Step S3: N), the control unit 11 judges whether or not a message (for example, a device information message, a participation request message, a reply message, or the like, described later) is received (Step S5). When a message is received (Step S5: Y), process of each of the messages is carried out (details will be described later) (Step S6). On the other hand, when no message is received (Step S5: N), the procedure goes back to process in Step S2. Thus, the above-mentioned process is repeatedly carried out in a non-participant node nm (which becomes a participant node in the middle of processes) until power is cut.

On the other hand, process in FIG. 7 (B) is started when, for example, power of the management server SA is thrown in (turned on). First, the management server SA initializes the participant node list (Step S101), judges whether or not the power is turned off (Step S102), and when power is turned off (Step S102: Y), the process is finished. On the other hand, when the power is not turned off (Step S102: N), the management server SA judges whether or not a message (for example, a later-described device information request message or the like) is received (Step S103). When it is received (Step S103: Y), processes respectively for each of the messages (details are to be described later) are executed (Step S104). On the other hand, when there is no message received (Step S103: N), the procedure goes back to process in Step S102. Thus, the above-mentioned process is repeatedly carried out in the management server SA until power is turned off.

Next, in a participation process of the Step S1, as shown in FIG. 8 (A), the control unit 11 of a non-participant node nm (here, a non-participant node n16 shown in FIG. 10 is assumed to be the one) performs initialization first and sets a registration flag to "false" and "ttl" (a variable) to, for example, "2", respectively (Step S11). Subsequently, the control unit 11 acquires an IP address or the like of the management server SA (for example, the IP address is saved in the storage unit 12 when shipped) and transmits to the management server SA through the communication unit 20 and the network 8 a device information request message for requesting device information of a plurality of participant nodes nn to which a participation request message indicating participation request into the overlay network 9 is to be transmitted (for example, a device information request packet having a transmitter address of the own IP address of the non-participant node n16 and a destination address of the IP address of the management server SA) (Step S13: FIG. 10 (A)).

On the other hand, the management server SA starts a process shown in FIG. 8 (B) when the device information request message thus transmitted from the non-participant node n16 is received. First, a predetermined number of device information of participant nodes nn (for example, 10) is selected from the participant node list (Step S110). For example, the predetermined number of participant nodes nn are randomly selected from the participant node list. Here, the predetermined number of participant nodes nn may be selected by weighted random corresponding to participation period (registration period) in the overlay network 9. For example, because when the participation period (registration period) in the overlay network 9 is longer, reliability of the node can be assumed to be higher. Therefore, a ratio of the node being selected is set to be higher when the participation period (registration period) is longer. Then, stability of the system can be improved in its entirety. However, in the DHT held by each of the participant nodes nn, link to a participant node having a longer participation period increases, and bad effect caused when the node withdraws from the system becomes large. In contrast thereto, in order to make a participant node nn, which is selected yet, preferentially select, a ratio for the node of being selected may be raised when the participation period (registration period) is shorter. Thus, concentration of link to a specific participation node nn can be prevented. However, update of information registered on the DHT becomes often. As there are an advantage and a disadvantage in both methods, depending on the usage of the system and how a participant node nn is used (especially, frequency distribution of power ON-OFF), control method may be selected. Further, by the weighted random corresponding to number of times the node has been selected (number of times the node has been selected is counted for each of participant nodes nn), the predetermined number of participant nodes nn may be selected. For example, because it can be assumed that a node having larger number of selected times is more reliable, ratio of a node of which number of selected times is larger is raised. Or to cause a participant node nn which has not been selected to be preferentially selected, ratio of the node of which number of selected times is smaller may be raised.

Next, the management server SA transmits a device information message to which device information of the plurality of participant nodes nn thus selected (device information packet of which sender address is set to be the IP address of the management server SA and destination address is set to be the IP address of the non-participant node n16) has been added to the non-participant node n16 through the network 8 (Step S111: FIG. 10 (B)).

On the other hand, the non-participant node 16 starts process shown in FIG. 8 (C) when the device information message transmitted from the management server SA is received. First, as a device information acquisition means, the control unit 11 of the non-participant node n16 acquires device information of the plurality of participant nodes nn added to the device information message (Step S61).

Subsequently, the control unit 11 of the non-participant node n16, as a reachable range setting means, sets a time to live (TTL) value to the above-mentioned "ttl (for example, 2)", sets (adds) the TTL value and adds a node ID of the non-participant node n16 to a participation request message indicating participation request. Then, as a participation request transmission means, the control unit 11 transmits the participation request message (for example, a device information request packet of which sender address is the IP address of the non-participant node n16 and destination address is the IP addresses of each of the participant nodes nn which can be specified by each of device information thus acquired) to each of the participant nodes nn through the communication unit 20 and the network 8 (Step S62: FIG. 10 (C)). Next, the control unit 11 of the non-participant node n16 sets (starts to count) a reply message receiving timer which is activated after a predetermined period of time (for example, 1 to 10 seconds) (Step S63). When such a reply message receiving timer is not cancelled (reset) by later-described process, process shown in FIG. 9 (A) will be started.

Here, the TTL is an example of information indicating reachable range of the participation request message transmitted on the network 8, is expressed by integer of which maximum value is "255", and is reduced by 1 when the message (packet) passes (is transferred) a router or the like. A packet with its TTL value changed to "0" is disposed at that moment, and disposal notification is sent to the sender of the packet. Therefore, larger the number of TTL value of the received message (packet) smaller the number of transferred times (HOP number). This means that effect to communication load to a communication route on the network 8 becomes smaller.

FIG. 10 (C) shows an example where though participation request messages are transmitted to the participant nodes n2, n4, n5, and n9, the participation request messages transmitted to the participant nodes n4, n5, and n9 do not reach the nodes because a TTL value became "0" in the middle of the routes, and consequently the participation request message reaches only to the participant node n2.

When the participant node n2 receives the participation request message thus transmitted from the non-participant node n16, the participant node n2 starts a process shown in FIG. 8 (D). First, the control unit 11 of the participant node n2 determines a level of a routing table (level number) to which a reply is to be sent on the basis of number of transferred times in the participation request message (Step S65).

Here, a transfer counter for counting number of transferred times is attached to the participation request message, and every time the message is transferred by a participant node nn by means of DHT routing the counter counts up by 1 (increases by 1). Though a transfer counter of the participation request message thus received by the participant node n2 is "0" because the message is not transferred yet, the counter increases one by one every time the message is transferred thereafter (for example, a transfer counter of a participation request message received by a participant node n6 shown in FIG. 11 (D) is "1").

Then, for example, in a case where the number of transferred times indicated by such a transfer counter is "0" a table in level 1 (for one line), when the number of transferred times is "1" a table in level 2, and when the number of transferred times is "2" a table in level 3 is determined to be a table to be sent back, respectively.

Next, the control unit 11 of the participant node 2 acquires a table of the level thus determined from a routing table of its own DHT, adds (attaches) the table of the level (level number) thus acquired to a reply message as reply information, and transmits the reply message (for example, a reply packet of which sender address is set to be the IP address of the participant node 2 and the destination address is set to be the IP address of the non-participant node n16) to the non-participant node n16 through the communication unit 20 and the network 8 (Step S66: FIG. 1 (E)).

Subsequently, the control unit 11 of the participant node 2 refers to the routing table of the DHT, searches for a transfer destination on the basis of the node ID of the non-participant node n16 added to the participation request message thus received (Step S67), and judges-whether or not there is a transfer destination (Step S68). For example, when the own participant node n2 has a node ID which is the closest to the node ID added to the participant request message and searches for a table entry closest to the node ID added to the participation request message in the routing table, the transfer destination designates the own participant node n2 (in other words, the own participant node n2 manages the node ID added to the participant request message), it is judged that there is no transfer destination (Step S68: N), and the procedure goes back to process shown in FIG. 7 (A). On the other hand, when the participant node n2 does not have a node ID closest to the node ID added to the participant request message (that is, there is another participant node nn which has the closest node ID), IP address of another participant node nn is found in the searched table entry, it is judged that there is a transfer destination (Step S68: Y), and the procedure proceeds to Step S69.

In Step S69, the control unit 11 of the participant node n2 counts up the transfer counter in the participation request message (increment by 1), acquires an IP address corresponding to a node ID closest to the node ID, added to the participation request message, from the routing table of the DHT, adds the IP address of the non-participant node n16 to the participation request message, and transmits (transfers) the participation request message (a participation request packet having an sender address being its own IP address (participation node n2) and a destination address being an IP address acquired from the routing table) to a participant node n6 corresponding to the IP address, acquired from the routing table (FIG. 11 (D)). Then, the procedure goes back to a process shown in FIG. 7 (A).

In a participant node nn receiving the participation request message thus transferred carries out a process shown in FIG. 8 (D), and the message is sequentially transferred from one node to another until the message reaches a participant node n14, which manages the node ID added to the participation request message. Each of the participant nodes n6, n13, and n14 receiving the participation request message transmits (sends back) a reply message, to which level (level number) corresponding to a value of the transfer counter is added, to the non-participant node n16 (FIG. 11 (E)).

On the other hand, when the non-participant node n16 receives the reply message thus transmitted from each participant nodes nn (for example, from the participant node n2) as a reply information receiving means, the non-participant node n16 starts process shown in FIG. 8 (E). First, the control unit 11 of the non-participant node n16 performs generation process of a routing table to thereby generate a table to be used by the non-participant node n16 on the basis of a routing table, added to the reply message thus received as a transfer destination table generation means (Step S71).

In this generation process of the routing table, as shown in FIG. 9 (A), the control unit 11 of the non-participant node n16 first reads out a level of a table added to the reply message thus received (Step S711), and judges whether or not a table of the level (level number) thus read out is registered in a routing table of its own non-participant node n16 (Step S712). When the table of the read out level is not registered (Step S712: N), a table of the level (level number) is registered in a spot corresponding to the routing table of its own non-participant node n16 (Step S713). Thereafter, the process is finished and returns to a process shown in FIG. 8 (E).

When generation process of the routing table is finished, the control unit 11 of the non-participant node n16 judges whether or not a registration flag is "false" in Step S72 shown in FIG. 8 (E). In a case where the registration flag is not "false", i.e. the registration flag is "true" (Step S72: N), the procedure returns to the process shown in FIG. 7 (A). On the other hand, when the registration flag is "false" (Step S72: Y), the control unit 11' transmits a registration message (a registration packet having a sender address being its own IP address (the non-participant node n2) and a destination address being the IP address of the management server SA) with its own node ID (the non-participant node n16) added to the management server SA (Step S73) through the communication unit 20 and the network 8.

Next, the control unit 11 of the non-participant node n16 sets up the registration flag to be "true" (Step S74) and cancels the reply message receiving timer (Step S75). The registration flag is a flag meaning that a non-participant node generates a table (even partially) and participates in the overlay network 9. In a case where it becomes "true", a later-described retry process in use of the timer (process of increasing ttl and transmitting the participation request message again: S634) is stopped.

On the other hand, when the management server SA receives the registration message thus transmitted from the non-participant node n16, a process shown in FIG. 8 (F) is started to thereby register the node ID, the IP address, and the like of the non-participant node n16, being the transmission side of the registration message into the participant node list (Step S115). Thus, participation of the non-participant node n16 into the overlay network 9 is completed.

Meanwhile, as shown in FIG. 12 (A), it is possible to assume a case where the reply message reaches a plurality of participant nodes nn (in the example of FIG. 12 (A), to the participant nodes n2 and n9) and a plurality of reply messages are transferred from the participant nodes nn which receives the participation request message transferred from each of the participation nodes nn and the plurality of participation nodes nn (FIG. 12 (B) and (C)). In this case, a reply message with a table of the same level added is replied from the plurality of participant nodes nn (for example, participant nodes n2 and n9 shown in FIG. 12 (B)) which received the participation request message having the same number of times of transfer. In the generation process of a routing table shown in FIG. 9 (A), a table of a later-received level received in Step S712 is disposed (that is, a table of the level is registered on a basis of first come, first served).

On the other hand, it is possible to assume a case where the participation request message does not reach any of participant nodes (because TTL value becomes "0" on the way of a communication route) and reply message is not received. In this case, the reply message receiving timer set in the Step S63 is activated, and process shown in FIG. 9 (B) is started. First, the control unit 11 of the non-participant node n16 judges whether or not the registration flag is "false" (Step S631). In a case where the registration flag is not "false" (Step S631: N), since participation registration has been finished, the process is completed.

On the other hand, in a case where the registration flag is "false" (Step S631: Y), the control unit 11 counts up the "ttl" by "1" (increment by 1) (Step S632), and judges whether or not the TTL value set in the Step S62 is 255 or less (Step S633). On the other hand, when the TTL value is not 255 or less (Step S633: N), the process is finished. On the other hand, when the TTL value is 255 or less (Step S633: Y), the control unit 11 changes and sets the TTL value to the "ttl" with its count being increased by "1" (for example, "3"), sets the TTL value to the participation request message, adds the node ID of the own non-participant node n16 to the participation request message, and transmits the participation request message to each of the participant nodes nn (the participant nodes nn corresponding to device information acquired in the Step S61) again through the communication unit 20 and the network 8 (Step S634). In other words, the non-participant node n16 changes and sets information indicating reachable range of the participation request information (TTL value) (here, TTL value is changed and set so that reachable range is enlarged more than the reachable range based on the previously set TTL value), sets (adds) the changed and set TTL value to a participation request message, and transmits the participation request message to the same participant nodes nn again, in a case where a reply message is not received within a predetermined period of time after transmission of the participation request message. Thus, in a case where the reply message is not received, the reachable range of the participation request message is enlarged little by little (TTL value is increased little by little), and the participation request message can be transmitted again. Therefore, an optimal routing table of a participation node nn can be acquired without fail.

It is possible to configure such that in a case where a reply message is not received within a predetermined period of time after transmission of the participation request message, the non-participant node n16 does not make the TTL value increase and transmits the participation request message to an identical participant nodes nn.

Next, the control unit 11 sets (starts to count) a reply message receiving timer, which is activated after a predetermined period of time (for example, 1 to 10 seconds) (Step S635). Unless the reply message receiving timer is not canceled (reset) as in the Step S63, a process shown in FIG. 9 (A) is started.

As explained above, according to the Embodiment 1, TTL value as information indicating reachable range of a participation request message is set low, the TTL value thus set is added to the participation request message and transmitted to a plurality of participant nodes nn notified by the management server SA, a routing table to be used by the own non-participant node is generated on the basis of a routing table included in a reply message transmitted from a participant node nn, which could receive the participation request message (that is, is closer on the network (for example, having a smaller HOP number)), and the non-participant node participates in the overlay network 9. Therefore, the overlay network 9 having locality on the network 8 considered can be constructed, and unnecessary load to the network 8 can be reduced (first effect).

Further, when there are a plurality of routing tables of an identical level in the routing tables, included in the reply messages from a plurality of participant nodes nn, the non-participant node n16 generates a routing table to be used by the non-participant node n16 on the basis of a routing table that is received on a basis of first come, first served among the plurality of routing tables of the same level. Therefore, a routing table of a participant node nn located in a position having a smaller network load is preferentially registered, and locality of the routing table is also taken into consideration. Thus, it becomes possible to construct the overlay network 9 having locality on the network 8 considered (second effect).

Further, in a case where a reply message is not received within a predetermined period of time after transmission of the participation request message, the non-participant node n16 changes and sets up information indicative of the reachable range of the participation request message (TTL value) (in this, TTL value is changed and set up so that the reachable range is enlarged more than the reachable range based on the previously set TTL value), sets up (adds) the changed and set TTL value to a participation request message, and transmits the participation request message to the same participant nodes nn again. Therefore, it is possible to construct an optimal routing table of a participation node nn can be acquired without fail, and the overlay network 9 having locality on the network 8 considered (third effect).

Further, the management server SA manages only the participant node list in which device information of all the participant nodes nn is described, selects a plurality of participant nodes nn, and notifies the non-participant node n16 the selected participant nodes nn. Therefore, the management server SA does not need to recognize a participant node nn which is close to a non-participant node nm network-wise and a management cost of the management server SA can be reduced (fourth effect).

Embodiment 2

Next, with reference to FIG. 13 and the like, operation of the content delivery system S in Embodiment 2 will be explained.

The Embodiment 2 is an example of a case where a management server for managing device information of all the participant nodes nn is not connected with the network 8, unlike the Embodiment 1.

In the Embodiment 2, main routines of a node is shown in FIG. 7 (A) and in a similar manner to those of the Embodiment 1 (this is common for both a participant node nn and a non-participant node nm).

Figure 13:
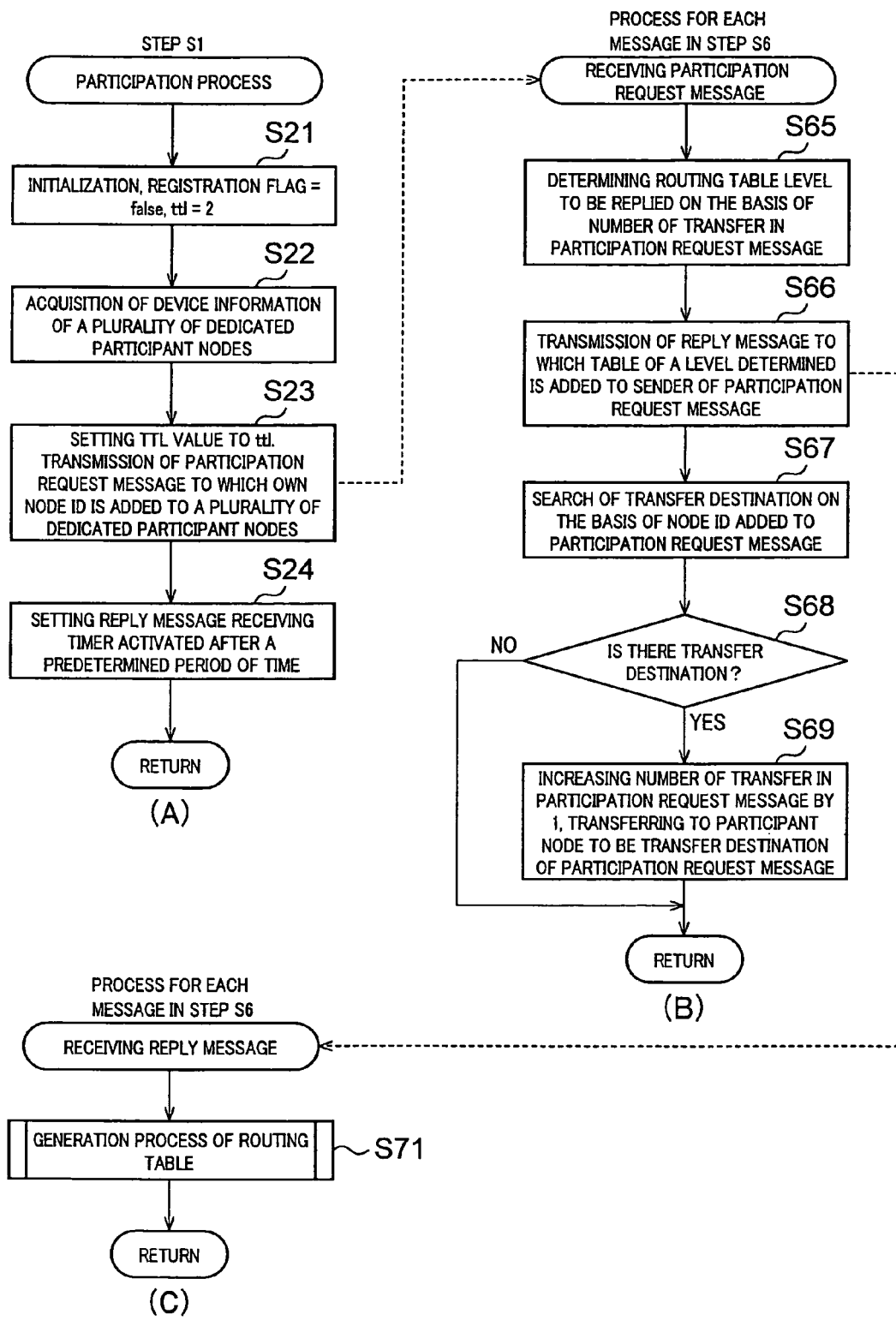
FIG. 13(A) is a flowchart for showing details of participation process in Step S1 shown in FIG. 7(A) in Embodiment 2.
FIG. 13(B) is a flowchart for showing process by a participant node nn when a participation request message is received in the Embodiment 2.
FIG. 13(C) is a flowchart for showing process by a non-participant node nm when a reply message is received in the Embodiment 2.

FIG. 13 (A) is a flowchart for showing details of participation process in Step S1 of FIG. 7 (A) according to the Embodiment 2. FIG. 13 (B) is a flowchart for showing a process by a participant node nn in a case where a participation request message is received in the Embodiment 2. FIG. 13 (C) is a flowchart for showing a process by a non-participant node nm in a case where a reply message is received in the Embodiment 2. In this, in FIG. 13 (A) to (C), the same reference numerals are used for the same processes in FIG. 8 (A) to (E).

In the participation process shown in FIG. 13 (A), in a manner similar to that in the Embodiment 1, the control unit 11 of a non-participant node nm first performs initialization, respectively sets up a registration flag to "false", and sets up "ttl (variable)" to for example "2" (Step S21).

Next, the control unit 11 acquires device information of a plurality of dedicated participant nodes nn (including IP address and the like) (Step S22). The dedicated participant node nn is a participant node nn having a high reliability of participation in the overlay network 9 because power is always turned on and device information of such plurality of dedicated participant nodes nn is, for example, saved in a non-participant node nm in advance (for example, set up at a time of shipment).

Next, the control unit 11 sets a TTL value to the "ttl (for example, 2)", sets up (adds) the TTL value to a participation request message, adds node ID of the non-participant node n16, and transmits the participation request message (for example, a participation request packet of which sender address is set to be the IP address of the non-participant node n16 and destination address is IP address of each of the dedicated participant nodes nn specified by each of device information thus acquired) to each of the dedicated participant nodes nn through the communication unit 20 and the network 8 (Step S23).

Next, the control unit 11 of the non-participant node n16, in the same manner as in the Embodiment 1, sets up (starts counting) a reply message receiving timer which is activated after a predetermined period of time (for example, 1 to 10 seconds) (Step S24).

Thus, in the similar manner to the Embodiment 1, a dedicated participant node nn which could receive a participation request message without making TTL value of down to "0" in the middle of a route receives the participation request message transmitted from a non-participant node nm. Upon the receipt, there starts a process shown in FIG. 13 (B). In this, the process shown in FIG. 13 (B) is a process similar to that shown in FIG. 8 (D). Therefore, redundant explanation is omitted.

Further, when the non-participant node nm receives a reply message transmitted from each of the dedicated participant nodes nn, a process shown in FIG. 13 (C) is started. In this, a routing table generation process shown in FIG. 13 (C) is the same as the process shown in FIG. 9 (A) and similar to that in the Embodiment 1. Therefore, redundant explanation is omitted. Further, in the Embodiment 2, when the participation request message does not reach any of the participant nodes nn, the reply message receiving timer set in the Step S24 is activated, and a process shown in FIG. 9 (B) is started.

As explained above, according to the Embodiment 2, in addition to the first to third effects of the Embodiment 1, a participant node nn which is close to a non-participant node nm on the network can be selected without using the management server SA. Therefore, concentration of device information request message from many non-participant nodes nm (concentration of load) to the management server SA can be avoided, and at the same time installation cost of the management server SA can be reduced.

Embodiment 3

Next, with reference to FIG. 14 and the like, operation of the content delivery system S in Embodiment 3 will be explained.

This Embodiment 3 is an operation example of a case where the management server SA for managing device information of all the participant nodes nn exists. However, this is an example of a case where the management server SA selects device information of a predetermined number (for example, 10) of participant nodes nn and notifies the device information to a non-participant node nm again when a reply message does not reach the non-participant node nm.

In this Embodiment 3, main routines of the management server SA is the same as those shown in FIG. 7 (B) and the same as in the Embodiment 1.

Figure 14:
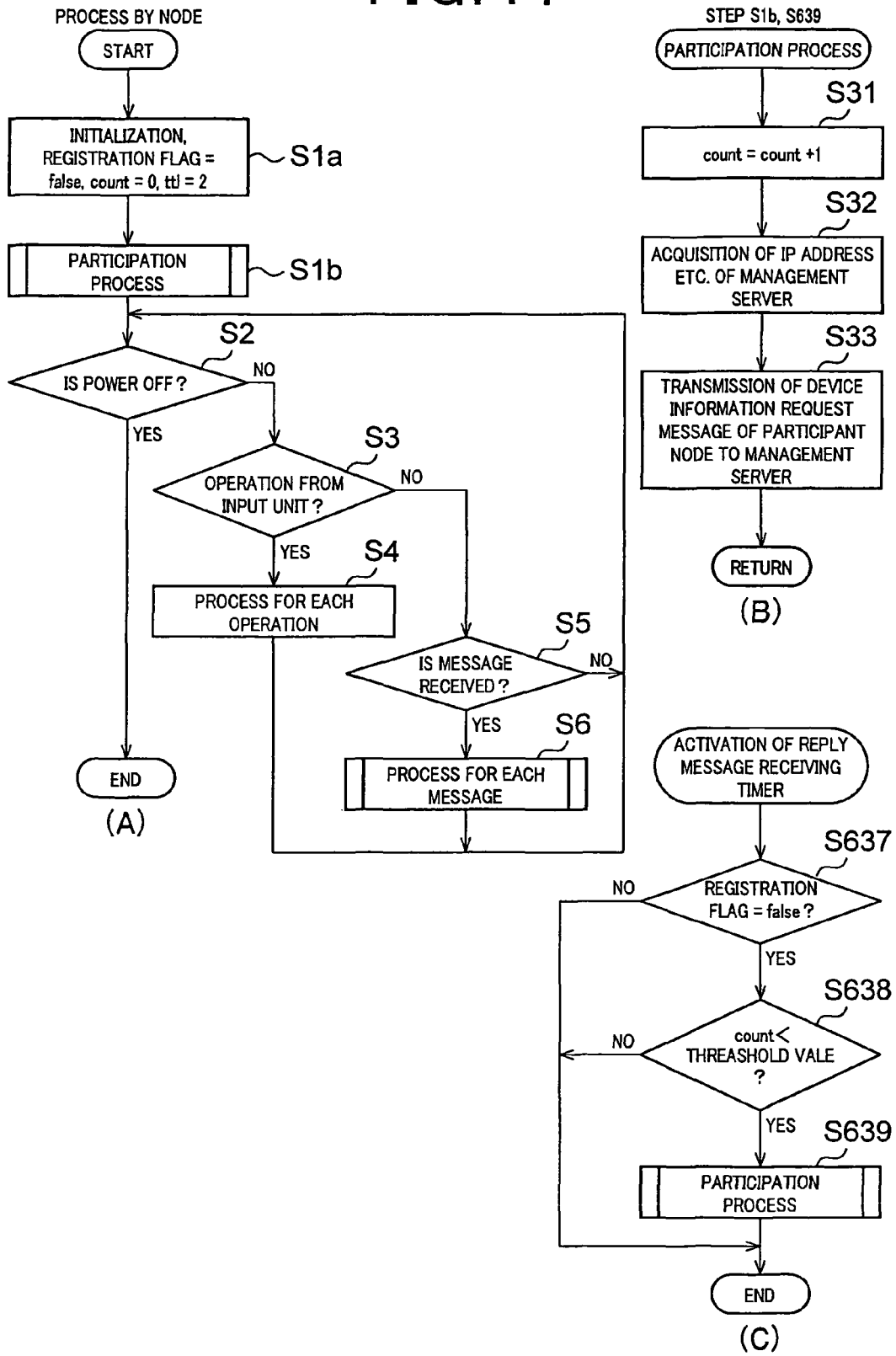
FIG. 14(A) is a flowchart for showing main routine of a node (common for both the participant node nn and the non-participant node nm) in Embodiment 3.
FIG. 14(B) is a flowchart for showing details of participation process in Step S1b shown in Step S1b of FIG. 14(A) according to the Embodiment 3.
FIG. 14(C) is a flowchart for showing process by the non-participant node nm when a reply message receiving timer is activated in the Embodiment 3.

FIG. 14 (A) is a flowchart for showing main routines of a node (common for both the participant node nn and the non-participant node nm) in Embodiment 3, FIG. 14 (B) is a flowchart for showing details of participation process in Step S1b shown in Step S1b 14 (A) in the Embodiment 3, and FIG. 14 (C) is a flowchart for showing process by the non-participant node nm when a reply message receiving timer is activated in the Embodiment 3.

Process in FIG. 14 (A) is started when, for example, power of a non-participant node nm is turned on and the control unit 11 first performs initialization and sets the registration flag to "false", "count (variable)" to, for example, "0", and "ttl (variable)" to, for example, "2" (Step S1a).

Subsequently, the control unit 11 performs participation process into the overlay network 9 (details will be described later) (Step S1b). Here, processes from Step S1 to S6 is the same as in FIG. 7 (A).

In the participation process of the Step S1b, as shown in FIG. 14 (B), the control unit 11 of the non-participant node nm first counts up the "count" by 1 (increment by 1) (Step S31), acquires IP address or the like (it may be saved in the storage unit 12 when shipped) of the management server SA (Step S32), and transmits a device information request message to the management server SA through the communication unit 20 and the network 8 (Step S33).

On the other hand, upon receiving the device information request message thus transmitted from the non-participant node n16, the management server SA starts process shown in FIG. 8 (B), selects device information of a predetermined number (e.g. 10) of the participant nodes nn from the participant node list in a manner of random or weighted random, and transmits the device information of the participant nodes nn thus selected to the non-participant node nm. Later on, in the Embodiment 3, processes in FIG. 8 (C) to (F) and 9 (A) will be performed, as in the Embodiment 1.

Then, when the participation request message does not reach any of the participant nodes nn (due to TTL value turning "0" in the middle of a route) and a reply message is not transmitted, the reply message receiving timer set in the Step S63 is activated and process shown in FIG. 14 (C) is started.

First, the control unit 11 of the non-participant node nm judges whether or not the registration flag is "false" (Step S637). When the registration flag is not "false" (Step S637: N), it means that participation registration is finished, and therefore the process is finished.

On the other hand, when the registration flag is "false" (Step S637: Y), the control unit 11 judges whether or not the "count" is smaller than threshold value (for example, 5) (Step S638). When the "count" is not smaller than the threshold value (Step S638: N), the process is completed.

On the other hand, when the "count" is smaller than the threshold value (e.g. 5) (Step S638: Y), the control unit 11 carries out a participation process similar to that in the Step S1b (Step S639). Thus, every time a reply message is not received and a predetermined period of time passes, a participation process is retried until the "count" reaches the threshold value.

As explained above, according to the Embodiment 3, in addition to the first, second, and fourth effect of the Embodiment 1, when a reply message does not reach, the management server SA selects device information of a predetermined number (e.g. 10) of participant nodes nn (for example, device information different from device information of participant nodes nn selected last time) in the manner of weighted random or the like, notifies device information to the non-participant node nm, and participation request message is transmitted to the participant nodes nn thus selected. Therefore, a routing table of an optimal participant node nn can be acquired without fail and the overlay network 9 with locality on the network 8 considered can be constructed.

Modified Example

Next, a modified example of process by a participant node nn in a case where a participation request message is received (FIG. 8 (D) and FIG. 13 (B)) and routing table generation process (FIG. 9 (A)) in Embodiments 1 to 3 will be explained with reference to FIG. 15.

Figure 15:
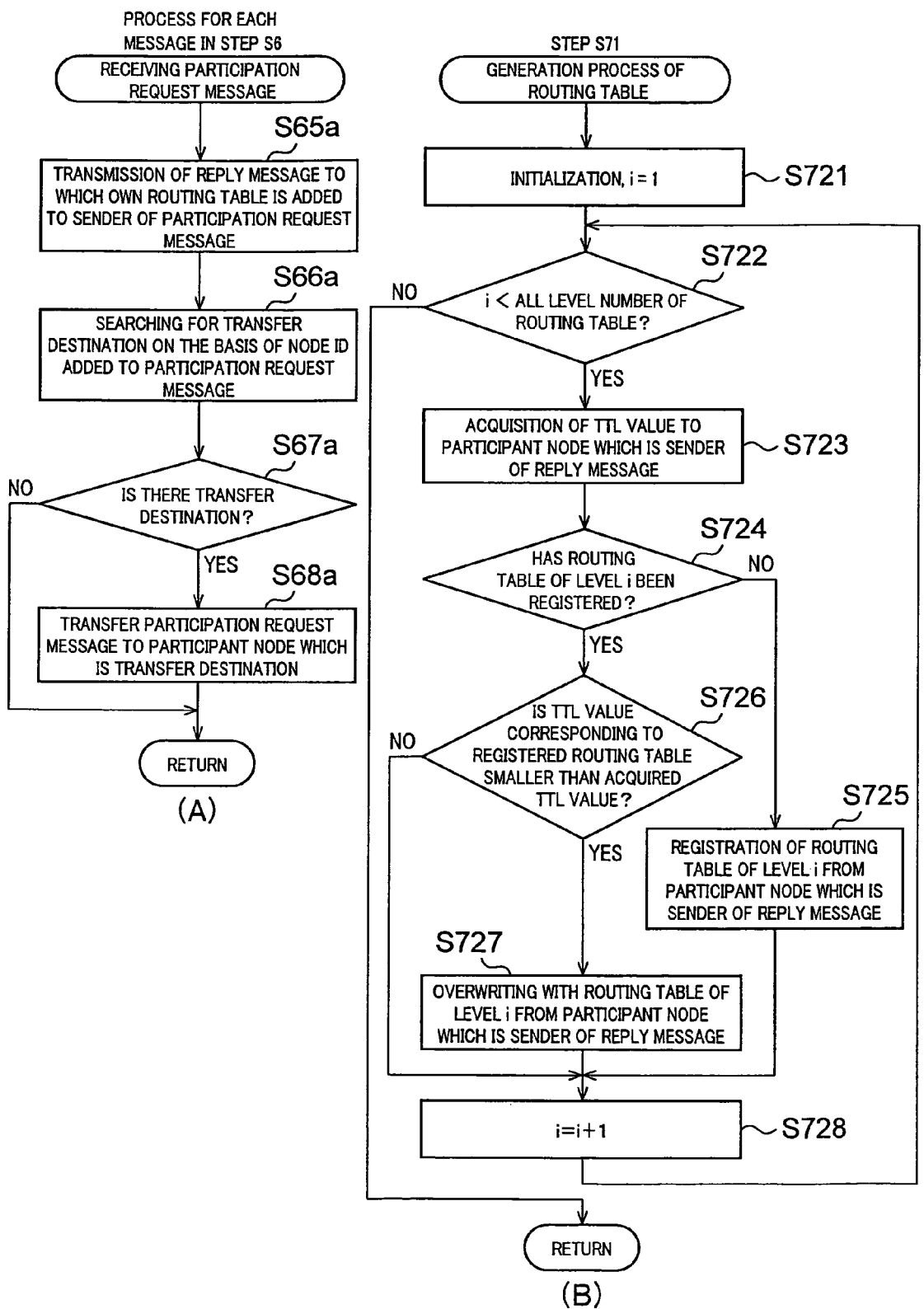
FIG. 15(A) is a flowchart for showing process by the participant node nn (process for each of messages in Step S6) when a participation request message is received in a modified example.
FIG. 15(B) is a flowchart for showing details of generation process of a routing table in Step S71 shown in FIGS. 8 (E) and 13 (C) in the modified example.

FIG. 15 (A) is a flowchart for showing process by the participant node nn (process for each of messages in Step S6) in a case where a participation request message is received in the modified example, and FIG. 15 (B) is a flowchart for showing details of generation process of a routing table in Step S71 shown in FIG. 8 (E) and 13 (C) in the modified example.

The process of FIG. 15 (A) is started when the participant node n2 receives a participation request message transmitted from the non-participant node n16. First, the control unit 11 of the participant node n2 acquires a routing table (for example, all table of all levels) of the DHT of the own participant node n2, add the routing table thus acquired to a reply message as reply information, and transmits (replies) the reply message (for example, a reply packet having a sender address being the IP address of the own participant node n2, and the destination address is set to be the IP address of the non-participant node n16) to the non-participant node n16 through the communication unit 20 and the network 8 (Step S65a: FIG. 11 (E)

Next, the control unit 11 of the participant node 2 refers to the routing table of the DHT, searches for a transfer destination on the basis of the node ID of the non-participant node n16 added to the participation request message thus received (Step S66a), and judges whether or not there is a transfer destination (Step S67a). For example, in a case where the own participant node n2 has a node ID which is closest to the node ID added to the participant request message and searches for a table entry closest to the node ID added to the participation request message in the routing table, the transfer destination designates the own participant node n2 (that is, the own participant node n2 manages the node ID added to the participant request message), it is judged that there is no transfer destination (Step S67a: N), and the procedure goes back to the process shown in FIG. 7 (A). On the other hand, when the participant node n2 does not have a node ID closest to the node ID added to the participant request message (that is, there is another participant node nn which has the closest node ID), IP address of another participant node nn is found in the searched table entry, it is judged that there is a transfer destination (Step S67a: Y) and the procedure proceeds to Step S68a.

In Step S68a, the control unit 11 of the participant node n2 acquires an IP address corresponding to a node ID closest to the node ID added to the participation request message from the routing table of the DHT, adds the IP address of the non-participant node n16 to the participation request message, and transmits (transfers) the participation request message (a participation request packet of which sender address is set to be the IP address of the own participant node n2 and destination address is set to be the IP address acquired from the routing table) to a participant node n6 corresponding to the IP address acquired from the routing table (FIG. 11 (D)). Then, the procedure goes back to the process shown in FIG. 7 (A).

Next, in the generation process of a routing table shown in FIG. 15 (B), the control unit 11 of the non-participant node n16 first performs initialization and sets a variable "i" indicating level to be one (Step S721).

Next, the control unit 11 judges whether or not "i" is smaller than the entire level number of the routing table (in the example of FIG. 3, 3) (Step S722). In a case where "i" is smaller (Step S722: Y), that is, a routing table is not registered yet in all the levels, the process shifts to Step S723. In a case where "i" is not smaller (Step S722: N), that is, a routing table of all the levels is registered, it goes back to the process shown in FIG. 8 (E) and the like.

In Step S723, the control unit 11 acquires a TTL value up to a participant node nn, which is the sender of the reply message (the TTL value can be acquired by checking how many TTL values of the participation request message is submitted before a reply is receive).

Next, the control unit 11 judges whether or not a routing table of level 1 is registered (Step S724). In a case of not being registered yet (Step S724: N), the process shifts to Step S725, and in a case where it is already registered (Step S724; Y), the process goes to Step S726.

In Step S725, the control unit 11 registers a routing table of level i in a participant node nn which is sender of the reply message to a routing table of the own non-participant node n16 and the process shifts to Step S728.

On the other hand, in Step S726, the control unit 11 judges whether or not the TTL value up to the participant node nn transmitting a registered routing table is smaller than the TTL value acquired in the Step S723 (TTL value to the participant node nn transmitting a reply message which has caused to start the process).

When the TTL value to the participant node nn transmitting the registered routing table is smaller than the TTL value acquired in Step S723 (Step S726: Y), the routing table of level i is overwritten and updated by a routing table of level i added to the reply message (Step S727), and the process shifts to Step S728. In other words, among a plurality of routing tables of the same level, the control unit 11 of the non-participant node n16 generates a routing table to be used by the own non-participant node n16 on the basis of a routing table in a participant node nn which receives the participation request message in a setting where reachable range of the participation request message is narrowest when there are a plurality of routing tables of the same level among each of routing tables includes in the reply message from each of the participant nodes nn. Thus, a routing table of a participant node nn having a small transfer number of times (HOP number) is preferentially registered. Therefore, locality is also considered with respect to a routing table.

On the other hand, in a case where the TTL value to a participant node nn which transmitting a registered routing table is not smaller than the TTL value acquired in the Step S723 (Step S726: N), the process goes to Step S728.

In Step S728, the variable "i" indicating level is incremented by one, and the process goes back to Step S722. Thus, process in Steps S722 to 728 is repeatedly performed until routing tables of all the levels are registered.

As explained above, according to the modified example, the control unit 11 of a non-participant node nm generates a routing table to be used by the own non-participant node nm on the basis of a routing table in a participant node nn which receives the participation request message in a setting where a reachable range of the participation request message is narrowest (a setting where TTL value is smaller). Therefore, a routing table of a participant node nn which is closer on the network (for example, HOP number is smaller) is preferentially registered, locality is considered with respect to a routing table, and the overlay network 9 with locality on the network 8 further considered can be constructed.

Here, it may be configured that change of setting of TTL value in the Embodiment 1 and re-selection of participant nodes nn in the Embodiment 3 are combined. For example, after change of setting of the TTL value-caused by not receiving a reply message is repeated for a predetermined number of times, for example, until the TTL value becomes "10", the TTL value is reduced (for example, set to be "2") and a participation process in the Step S1b is called up and repeated until the "count" reaches a threshold in the participation process. On the contrary thereto, the TTL value may be fixed and the participation process in the Step S1b is repeated. Even when a reply message is not received, it is configured such that the TTL value may be increased and the participation process is repeated until the TTL value reaches the upper limit thereof (255). By this configuration, an improved and optimal routing table of a participant node nn can be acquired, In the above embodiments, the overlay network 9 constructed by algorithm using a DHT is exemplified. However, the present invention is not limited thereto.

In the above embodiments, TTL is exemplified as information indicative of the reachable range. However, the present invention is not limited thereto and other information may also be applied.

The present invention is not limited to the above embodiments. The embodiments are only for examples and any device or system that has substantially the same configuration to the technical idea according to the claims recited in the present invention and demonstrating effects similar thereto may be included in the technical scope of the present invention.

Further, all the disclosure in Japanese Patent Application (No. 2005-210077) filed in Jul. 20, 2005, including specification, claims, figures, and abstracts, is incorporated herein by reference.

The present invention is not confined to the configuration listed in the foregoing embodiments, but it is easily understood that the person skilled in the art can modify such configurations into various other modes, within the scope of the present invention described in the claims.

What is claimed is:

1. A node device which is to participate in an overlay network formed by participation of all or a part of a plurality of node devices, mutually connected through a communication network, comprising:

a device information acquisition unit for acquiring device information of the plurality of node devices to which participation request information indicative of a participation request into the overlay network is to be transmitted;

a reachable range setting unit for setting up information indicative of a reachable range of the participation request information, which is transmitted on the communication network;

a participation request information transmission unit for adding information indicative of the reachable range to the participation request information and transmitting the participation request information including the information indicative of the reachable range to each of the node devices, each of the node devices being respectively specified by each of the acquired device information;

a reply information receiving unit for receiving reply information, which is transmitted from each of the node devices that receive the participation request information, and the reply information transmitted from each node device includes a transfer destination table specifying a transfer destination of information on the overlay network; and a transfer destination table generation unit for generating the transfer destination table to be used by the own node device, on the basis of the transfer destination table included in the received reply information;

wherein the transfer destination table is classified into a plurality of levels; and in a case where the reply information receiving unit receives the reply information from the plurality of node devices, and when there are a plurality of transfer destination tables of the same level in each of transfer destination tables included in each of the reply information, the transfer destination table generation unit generates a transfer destination table to be used by itself on the basis of the transfer destination table of one of the node devices, the transfer destination table being receivable when the reachable range of the participation request information is the narrowest among the plurality of transfer destination tables of the same level.

2. The node device according to claim 1, wherein in a case where the reply information is not received within a predetermined period of time after transmission of the participation request information, the participation request information transmission unit transmits the participation request information to the each of the node devices again.

3. The node device according to claim 1, wherein in a case where the reply information is not received within a predetermined period of time after transmission of the participation request information, the reachable range setting unit changes and sets up information indicative of the reachable range of the participation request information, and the participation request information transmission unit adds information indicative of the reachable range, thus changed and set up, to the participation request information, and transmits the participation request information including the changed information indicative of the of the reachable range to each of the node devices again.

4. The node device according to claim 3, wherein the reachable range setting unit changes and sets up information indicative of the reachable range so that the range becomes wider than the previously set reachable range.

5. The node device according to claim 1, wherein in a case where the reply information is not received within a predetermined period of time after transmission of the participation request information, the device information acquisition unit acquires a plurality of device information which are different from the device information of the node devices previously acquired, and the participation request information transmission unit transmits the participation request information to each of the node devices, specified by the device information thus acquired.

6. The node device according to claim 1, wherein the participation request information transmission unit adds identification information unique to its own to the participation request information and transmits the participation request information;

the participation request information is transferred from the node device receiving the participation request information to a node device, which manages the unique identification information, in accordance with the unique identification information; and the reply information receiving unit receives the reply information transmitted from each of node devices, transferring the participation request information, and the transfer destination table generation unit generates a transfer table to be used by its own on the basis of a transfer destination table, included in each of the reply information.

7. The node device according to claim 1, wherein the reachable range setting unit sets information indicative of a number of transferred times of message, as the reachable range.

8. The node device according to claim 7, wherein the reachable range setting unit sets information indicative of HOP member indicative of the number of transferred times of the message for which a relay device has been passed, as the number of transferred times of the message.

9. The node device according to claim 7, wherein the reachable range setting unit sets a TTL value indicative of a time to live, as the number of transferred times of the message.

10. The node device according to claim 7, wherein the reachable range setting unit sets the number of transferred times of the message, as the reachable range, in such a way that the set number of transferred times of the message is larger than the number of transferred times of the message set at a last time.

11. A non-transitory computer-readable storage medium that stores a computer-executable program, the program comprising a sequence of instructions, which when executed by a computer, the instructions causing the computer to function as:

the node device according to claim 1.

12. An information delivery system having a plurality of node devices, which are mutually connected through a communication network including an overlay network, formed by participation of all or a part of the plurality of node devices, wherein each node device which is to participate in the overlay network comprises:

a device information acquisition unit for acquiring device information of a plurality of node devices to which participation request information indicative of participation request into the overlay network is to be transmitted;

a reachable range setting unit for setting up information indicative of a reachable range of the participation request information, which is transmitted on the communication network; and a participation request information transmission unit for adding information indicative of the reachable range to the participation request information and transmitting the participation request information including the information indicative of the reachable range to each of the node devices specified by each of the acquired device information, wherein each node device which receives the participation request information comprises:

a participation request information receiving unit for receiving the participating request information; and a reply information transmission unit for transmitting reply information including a transfer destination table specifying a transfer destination of information on the overlay network to each node device that sends the participation request information, and wherein each node device which is to participate in the overlay network comprises:

a reply information receiving unit for receiving reply information including the transfer destination table; and a transfer destination table generation unit for generating the transfer destination table to be used by itself on the basis of the transfer destination table included in the received reply information;

wherein the transfer destination table is classified into a plurality of levels; and in a case where the reply information receiving unit receives the reply information from the plurality of node devices, and when there are a plurality of transfer destination tables of the same level in each of transfer destination tables included in each of the reply information, the transfer destination table generation unit generates a transfer destination table to be used by itself on the basis of the transfer destination table of one of the node devices, the transfer destination table being receivable when the reachable range of the participation request information is the narrowest among the plurality of transfer destination tables of the same level.

13. A network participation method of participating into an overlay network, formed by participation of all or a part of a plurality of node devices mutually connected through a communication network, wherein each node device which is to participate into the overlay network comprises:

a step of acquiring device information of a plurality of node devices to which participation request information indicative of a participation request into the overlay network is to be transmitted;

a step of setting up information indicative of a reachable range of the participation request information, which is transmitted on the communication network; and a step of adding information indicative of the reachable range to the participation request information and transmitting the participation request information including the information indicative of the reachable range to each of the node devices, specified by each of the acquired device information, wherein each node device which receives the participation request information comprises:

a step of receiving the participation request information, and a step of transmitting the reply information including a transfer destination table which specifies transfer destination of the information on the overlay network to each node device that sends the participation request information, and wherein each node device which is to participate in the overlay network comprises:

a step of receiving reply information including the transfer destination table; and a step of generating the transfer destination table to be used by itself on the basis of the transfer destination table included in the reply information thus received;

wherein the transfer destination table is classified into a plurality of levels; and in a case where the reply information receiving unit receives the reply information from the plurality of node devices, and when there are a plurality of transfer destination tables of the same level in each of transfer destination tables included in each of the reply information, the transfer destination table generation unit generates a transfer destination table to be used by itself on the basis of the transfer destination table of one of the node devices, the transfer destination table being receivable when the reachable range of the participation request information is the narrowest among the plurality of transfer destination tables of the same level.

* * * * *